US012429797B2

(12) United States Patent
Suetsugu et al.

(10) Patent No.: US 12,429,797 B2
(45) Date of Patent: Sep. 30, 2025

(54) IMAGE FORMING APPARATUS AND IMAGE FORMING SYSTEM WITH DISPLAY OF REMAINING TONER AMOUNT

(71) Applicant: CANON KABUSHIKI KAISHA, Tokyo (JP)

(72) Inventors: Masahiro Suetsugu, Kanagawa (JP); Shinichi Nishida, Kanagawa (JP); Tetsushi Uneme, Kanagawa (JP); Tsuyoshi Ogawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 37 days.

(21) Appl. No.: 18/502,638

(22) Filed: Nov. 6, 2023

(65) Prior Publication Data

US 2024/0152072 A1 May 9, 2024

(30) Foreign Application Priority Data

Nov. 7, 2022 (JP) ................................ 2022-178498

(51) Int. Cl.
*G03G 15/08* (2006.01)
*G03G 15/00* (2006.01)

(52) U.S. Cl.
CPC ..... *G03G 15/0856* (2013.01); *G03G 15/0862* (2013.01); *G03G 15/5016* (2013.01); *G03G 2215/0891* (2013.01)

(58) Field of Classification Search
CPC ........... G03G 15/0862; G03G 15/0856; G03G 15/5016; G03G 2215/0891
USPC .............................................. 399/27, 64, 81
See application file for complete search history.

(56) References Cited

U.S. PATENT DOCUMENTS 11,262,683 B2 3/2022 Umeda et al.
11,467,514 B2 * 10/2022 Sato .................. G03G 15/0874
2016/0033895 A1 * 2/2016 Noda .................. G03G 15/553 399/258
2016/0124366 A1 * 5/2016 Shimazu ........... G03G 15/0879 399/27
2017/0168417 A1 * 6/2017 Arai .................. G03G 15/0856
2021/0103246 A1 * 4/2021 Morihara ........... G03G 21/1647
(Continued)

FOREIGN PATENT DOCUMENTS

JP 2013-57841 A 3/2013
JP 2016-133785 A 7/2016
(Continued)

*Primary Examiner* — Robert B Beatty
(74) *Attorney, Agent, or Firm* — Venable LLP

(57) ABSTRACT

An image forming apparatus includes a mounting portion, an accommodating portion, a remaining toner amount detecting portion, a display portion, and a controller. In a supplying operation, the controller sets a threshold on the basis of a first output value before toner supply from the toner container to the accommodating portion. The controller discriminates whether or not toner in a certain amount or more is supplied to the accommodating portion by comparing the threshold with a second output value after the toner is supplied from the toner container to the accommodating portion. The threshold is a value between the first output value and a third output value when the toner in a total amount accommodated in the toner container that has never been used is supplied to the accommodating portion before supply of the toner, and is closer to the third value than to the first value.

13 Claims, 22 Drawing Sheets

(56) References Cited

U.S. PATENT DOCUMENTS

| | | | | |
|---|---|---|---|---|
| 2021/0223715 | A1* | 7/2021 | Smith | G03G 15/0856 |
| 2021/0271197 | A1* | 9/2021 | Burger | G03G 15/556 |
| 2022/0229383 | A1* | 7/2022 | Matsumoto | G03G 15/0863 |
| 2022/0404735 | A1* | 12/2022 | Sato | G03G 15/5016 |
| 2023/0161282 | A1* | 5/2023 | Ogawa | G03G 15/5016<br>399/53 |

FOREIGN PATENT DOCUMENTS

| | | |
|---|---|---|
| JP | 2020-154300 A | 9/2020 |
| JP | 2021-026218 A | 2/2021 |
| JP | 2021-056475 A | 4/2021 |

* cited by examiner (a)

(b)

(a)

(b)

(a)

(b)

(a)

(b)

IMAGE FORMING APPARATUS AND IMAGE FORMING SYSTEM WITH DISPLAY OF REMAINING TONER AMOUNT

FIELD OF THE INVENTION AND RELATED ART

The present invention relates to an image forming apparatus for forming an image on a recording material and an image forming system including the image forming apparatus.

In general, an image forming apparatus of an electrophotographic type forms an image by transferring a toner image, formed on a surface of a photosensitive drum, onto a transfer material as a transfer medium. Further, as a developer supplying type, for example, a process cartridge type or a toner container supplying (replenishing) type has been known. The process cartridge type is a type in which the photosensitive drum and a developing (developer) container are integrally assembled as a process cartridge in which the process cartridge is exchanged with a new one when a developer runs out. On the other hand, the toner container supplying type is a type in which when toner runs out, toner is supplied (replenished) from a toner container, such as a toner pack or a toner bottle, to a developing container.

Conventionally, an image forming apparatus in which ha remaining toner amount of a developing container is estimated by a light receiving time of detection light, emitted from a light emitting portion and passed through an inside of the developing container, received by a light receiving portion has been proposed (Japanese Laid-Open Patent Application No. 2020-154300). The developing container is provided with a stirring member for stirring the toner, and the light receiving time of the detection light by the light receiving portion becomes longer with a smaller remaining toner amount of the toner in the developer container. Further, information on the remaining toner amount detected is displayed on a remaining toner amount panel provided on a surface of the image forming apparatus.

The remaining toner amount panel is a panel member including three scales, and each of the scales is lighted or extinguished depending on a remaining toner amount, so that the remaining toner amount panel notifies a user of the remaining toner amount.

SUMMARY OF THE INVENTION

According to an aspect of the present invention, there is provided an image forming apparatus to which a toner container for accommodating toner is mounted, comprising: a mounting portion to which the toner container is to be mounted; an accommodating portion configured to accommodate the toner supplied from the toner container mounted on the mounting portion; a remaining toner amount detecting portion configured to output an output value on the basis of a toner amount of the toner accommodated in the accommodating portion; a display portion configured to display a remaining toner amount on the basis of the output value outputted from the remaining toner amount detecting portion, wherein the display portion changes in state from a first state to a second state different from the first state by the toner in a certain amount or more being supplied from the toner container to the accommodating portion; and a controller configured to control the display portion, wherein (i) when a supplying operation for supplying the toner from the toner container to the accommodating portion is performed, the controller sets a threshold changing on the basis of a first output value outputted from the remaining toner amount detecting portion before the toner is supplied from the toner container to the accommodating portion, and (ii) the controller discriminates whether or not the toner in the certain amount or more is supplied to the accommodating portion by comparing the threshold with a second output value outputted from the remaining toner amount detecting portion after the toner is supplied from the toner container to the accommodating portion, wherein the threshold is a value between the first output value and a third output value outputted from the remaining toner amount detecting portion in a case where the toner in a total amount accommodated in the toner container that has never been used is supplied to the accommodating portion before supply of the toner, and is closer to the third output value than to the first output value.

Further features of the present invention will become apparent from the following description of exemplary embodiments with reference to the attached drawings.

Figure 3:
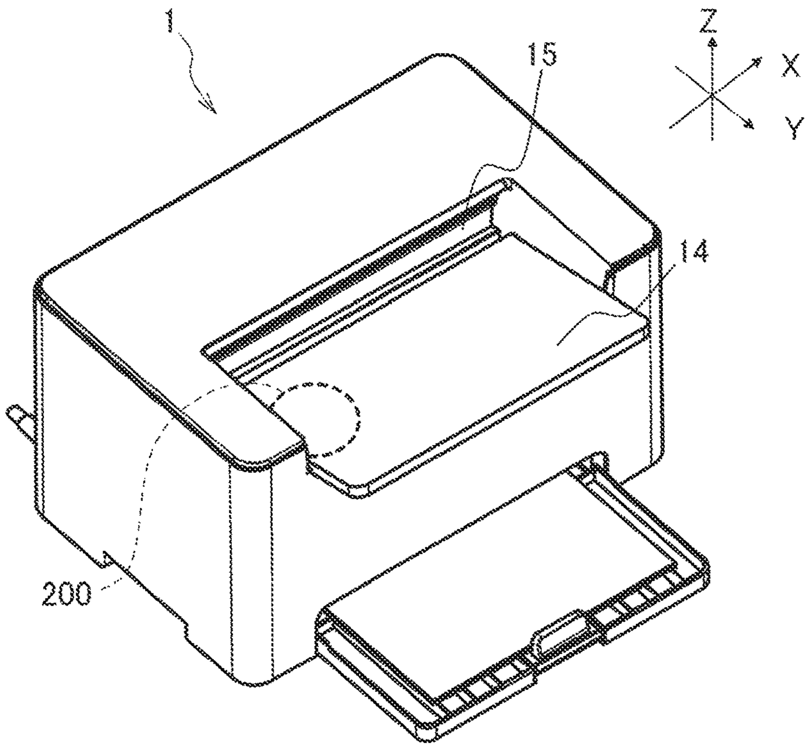
Figure 3:
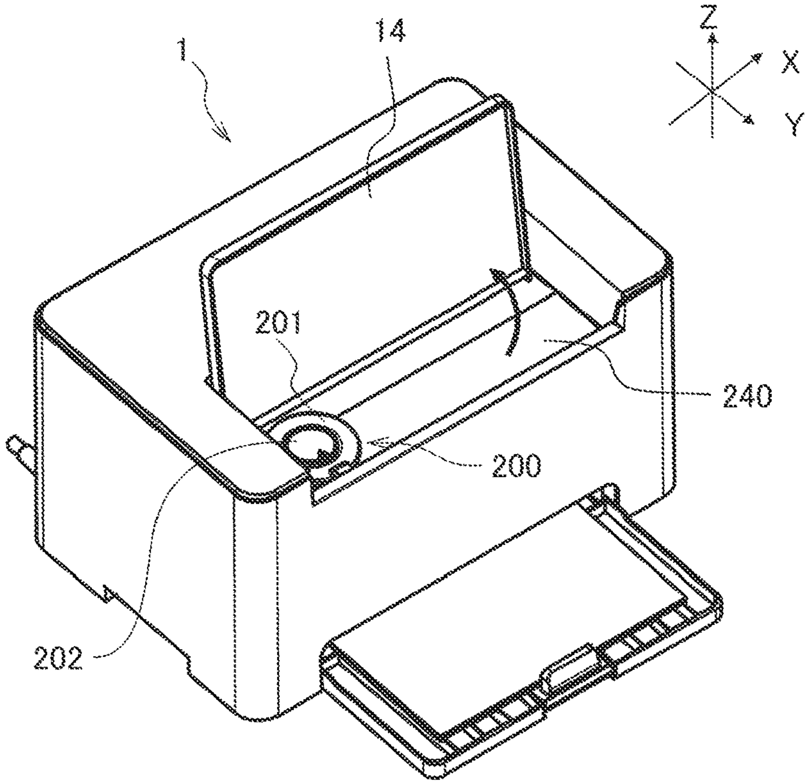

Part (a) of FIG. 3 is a perspective view showing the image forming apparatus in a state in which a discharge tray is in a closed position, and part (b) of FIG. 3 is a perspective view showing the image forming apparatus in a state in which the discharge tray is in an open position.

Figure 4:
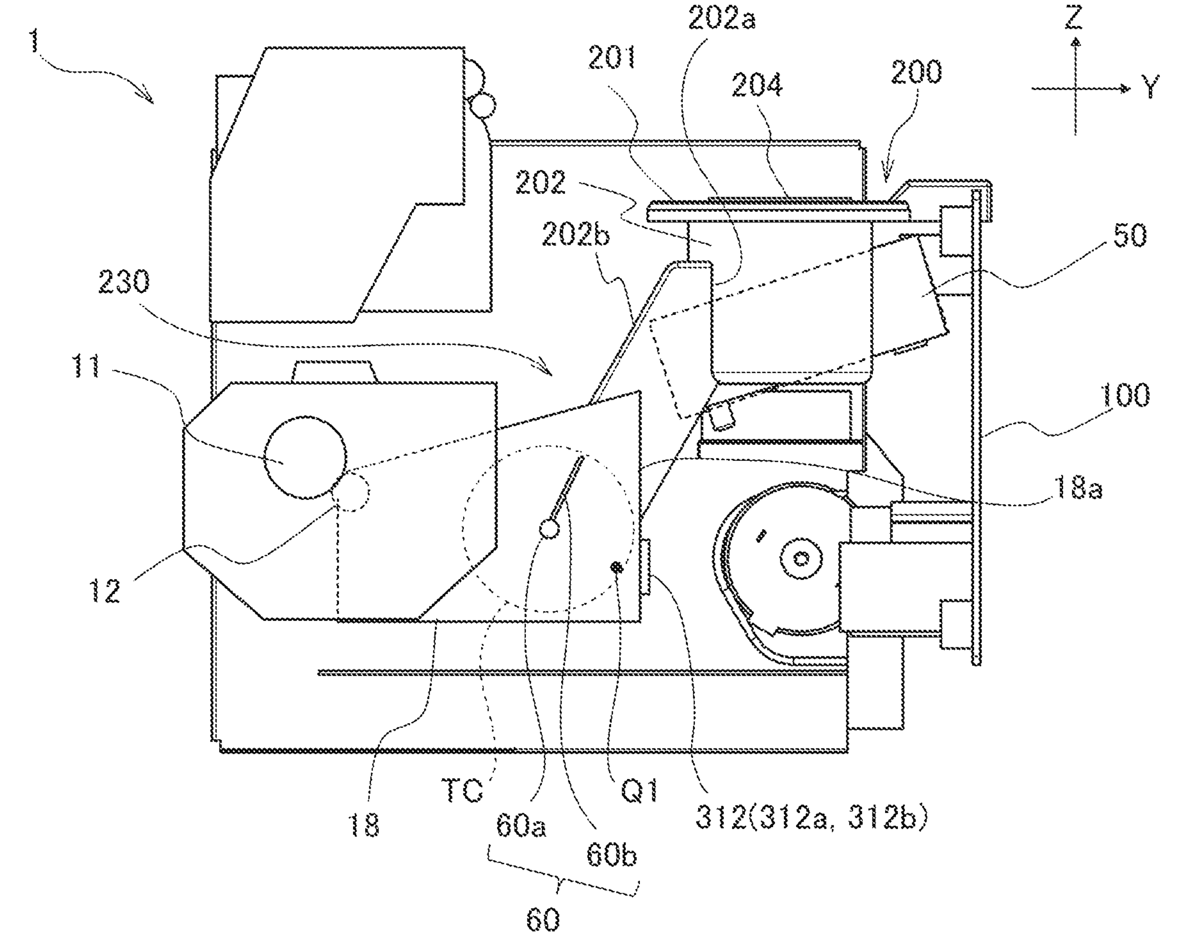

FIG. 4 is a sectional view of a developing container of the image forming apparatus.

Figure 5:
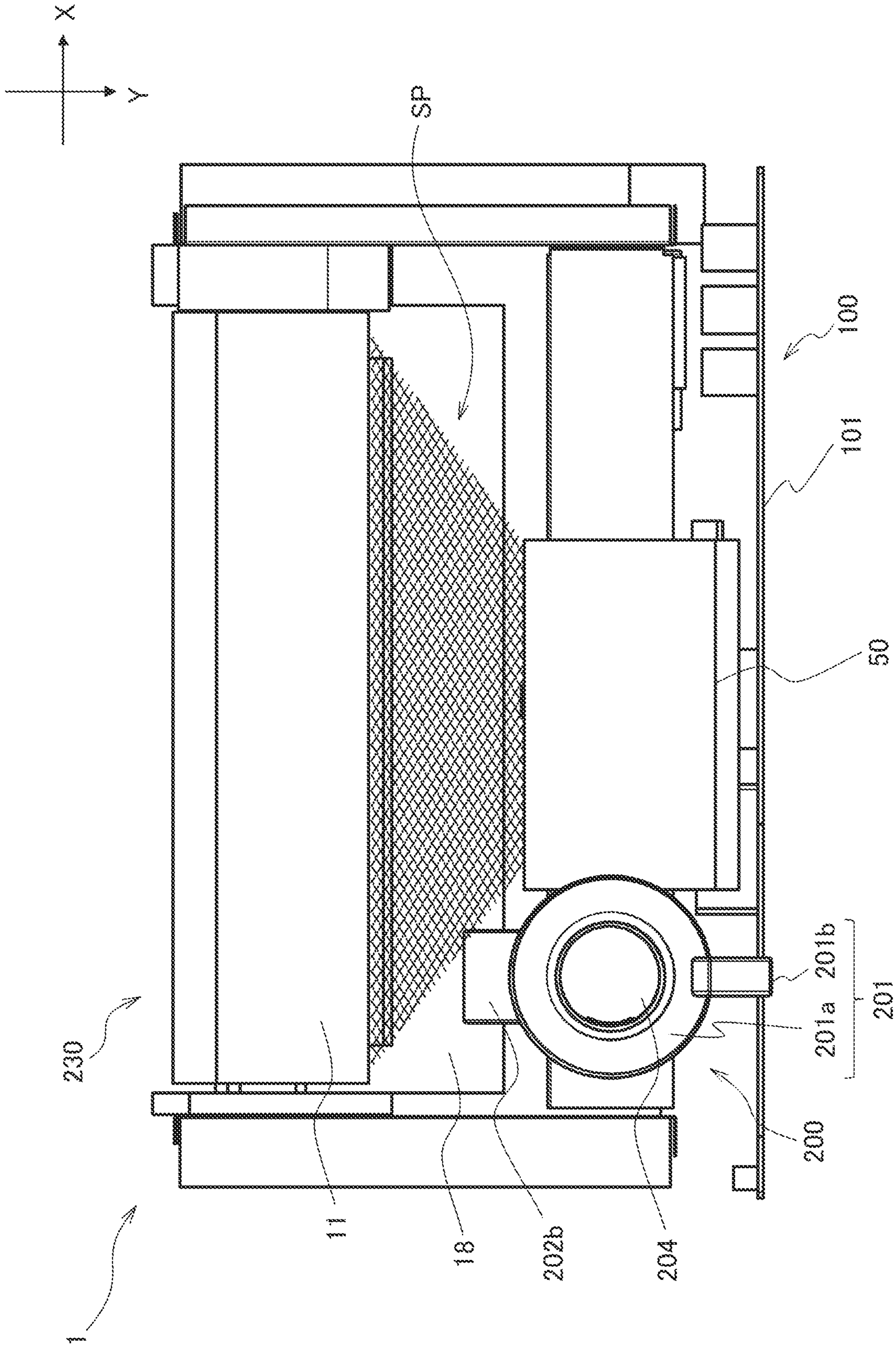

FIG. 5 is a top (plan) view of a supplying portion, a scanner unit, and a photosensitive drum as viewed from above.

Figure 6:
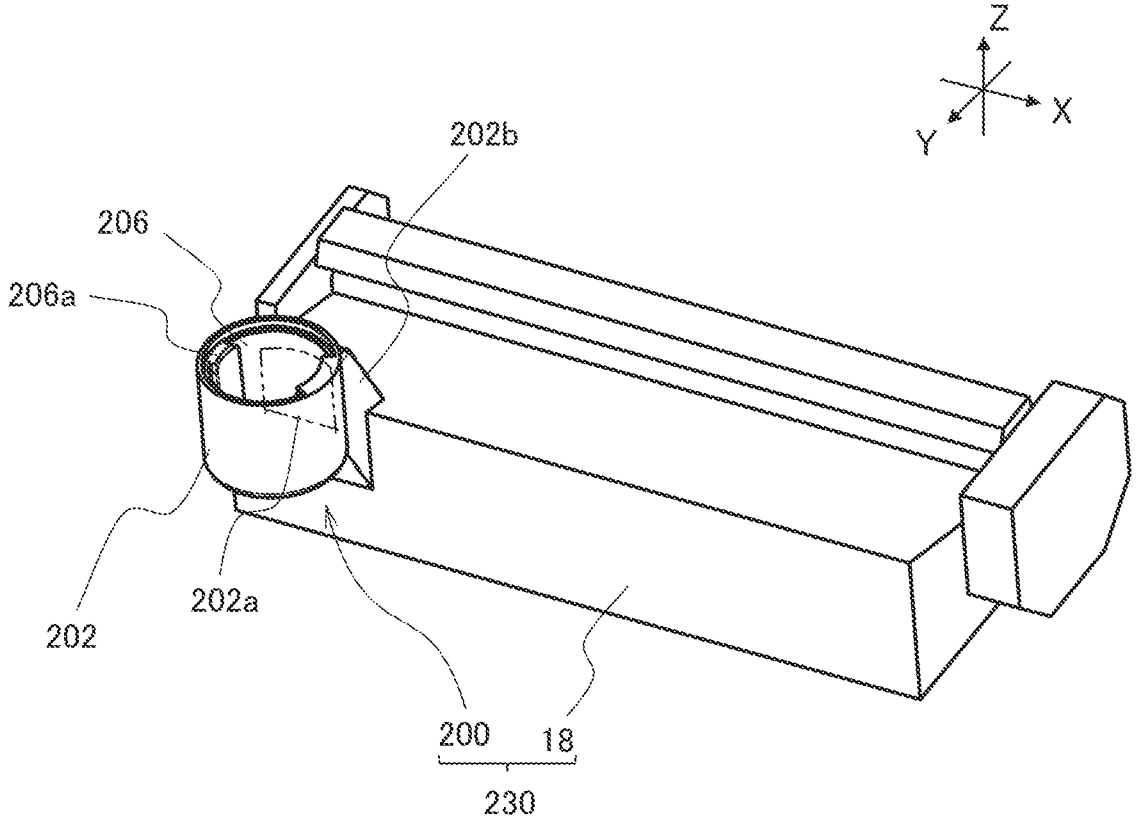

FIG. 6 is a perspective view of the developing container.

Figure 7:
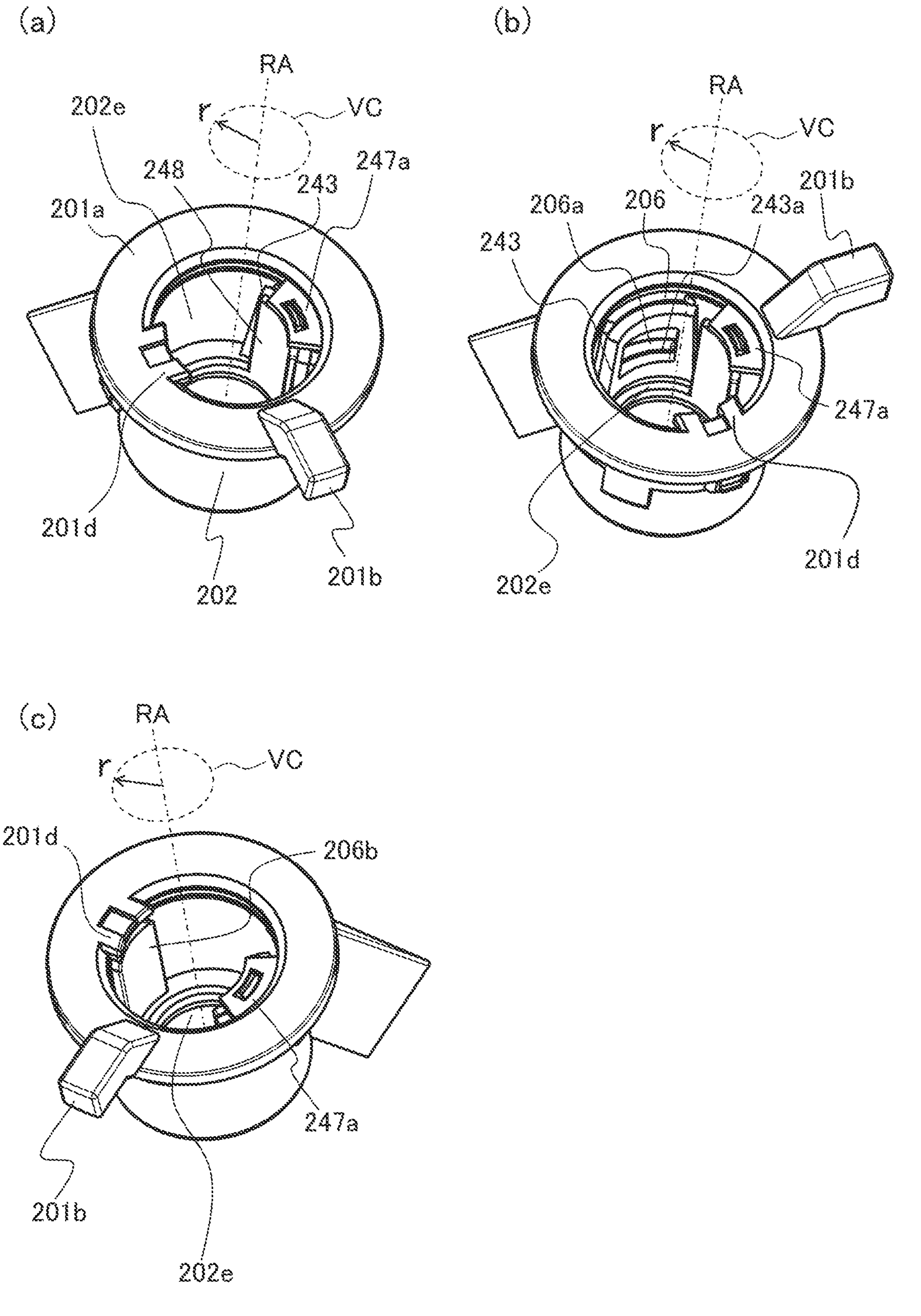

Part (a) of FIG. 7 is a perspective view showing a state in which a lever is positioned in an operation position, part (b) of FIG. 7 is a perspective view showing a state in which the lever is positioned in a supply position, and part (c) of FIG. 7 is a perspective view showing a state in which the lever is positioned in the operation position as viewed from an observation point different from those in parts (a) and (b) of FIG. 7.

Figure 8:
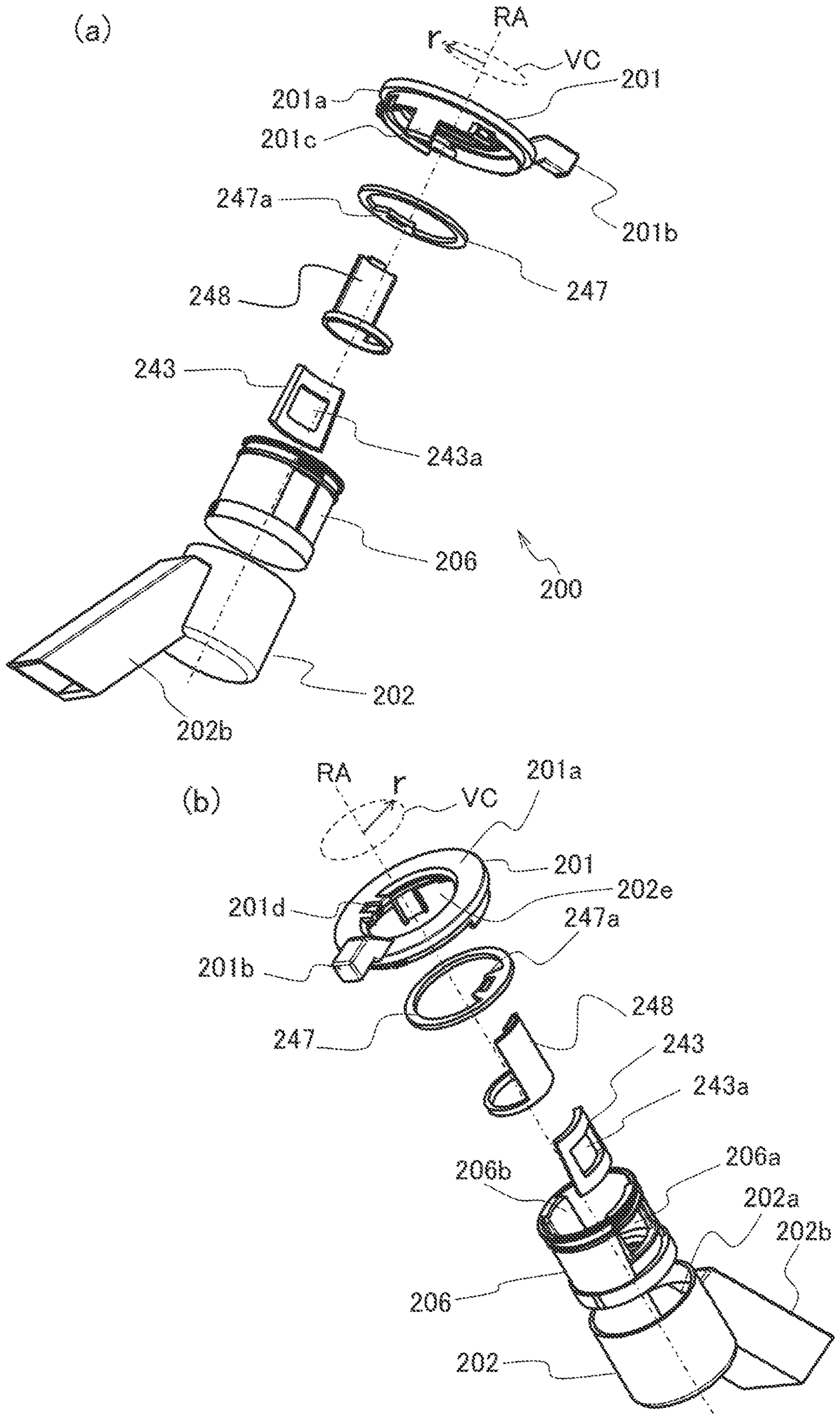

Part (a) of FIG. 8 is an exploded perspective view of the supplying portion, and part (b) of FIG. 8 is another exploded perspective view of the supplying portion.

Figure 9:
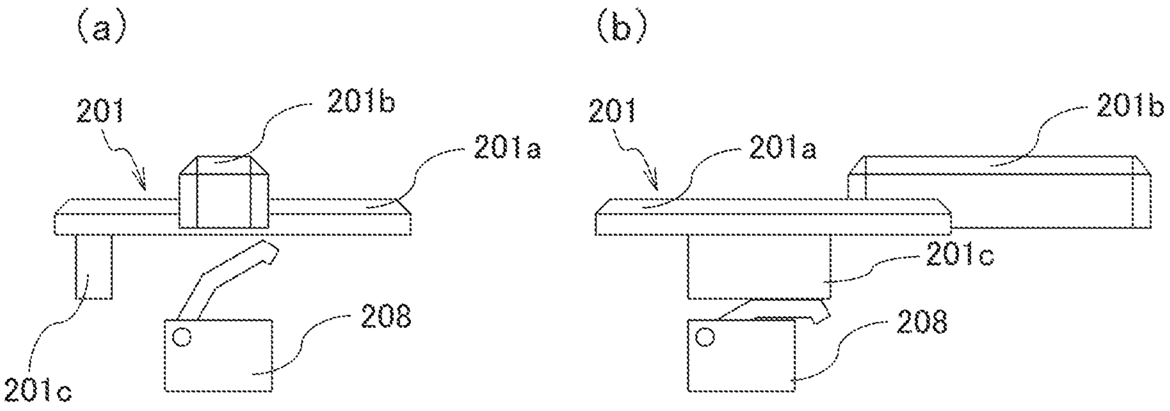

Part (a) of FIG. 9 is a schematic view showing a state of a switch when the lever is in the operation position, and part (b) of FIG. 9 is a schematic view showing a state of the switch when the lever is in the supplying position.

Figure 10:
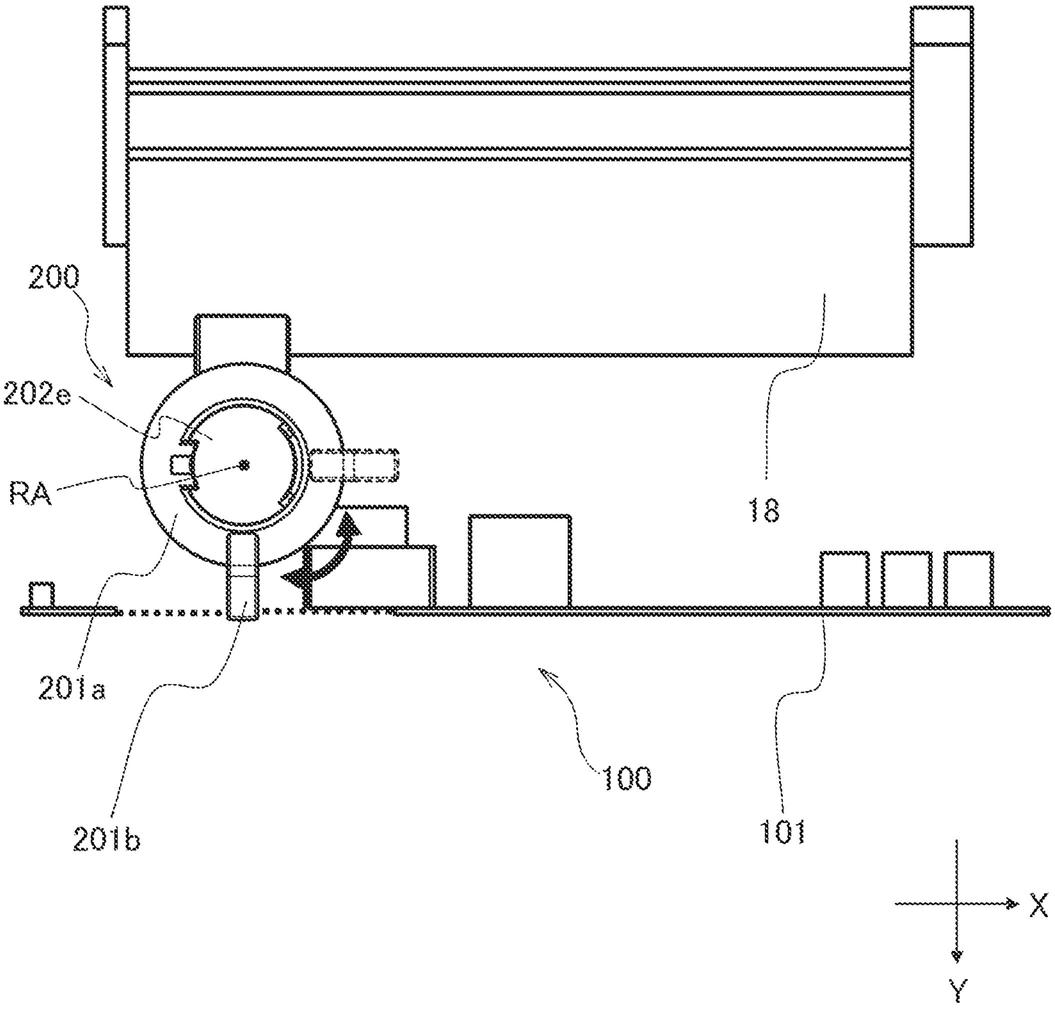

FIG. 10 is a schematic view showing a position of a gripping portion of the lever when the lever is in the operation position and the supplying position.

Figure 11:
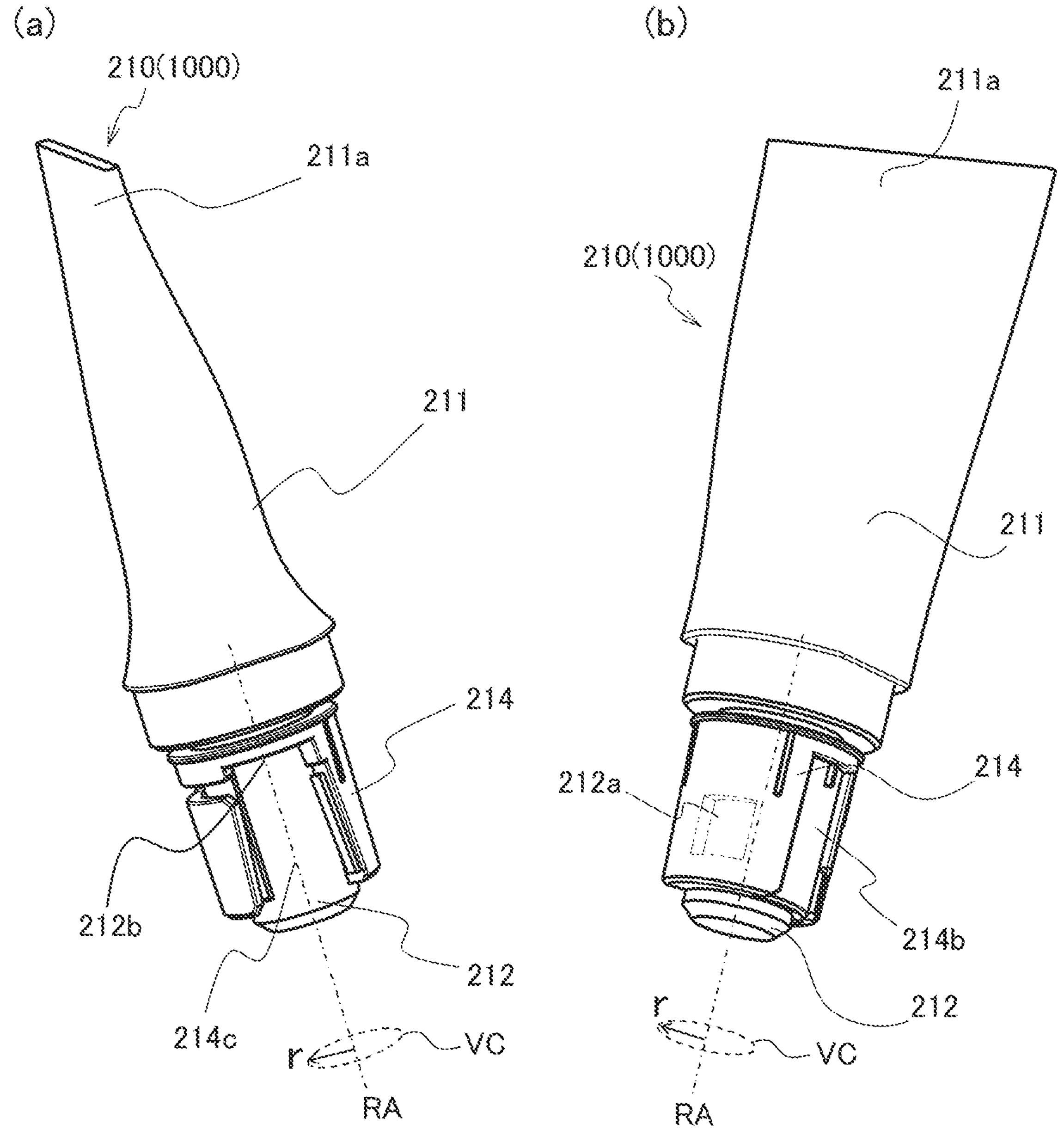

Part (a) of FIG. 11 is perspective view of a supply pack, and part (b) of FIG. 11 is another perspective view of the supply pack.

Figure 12:
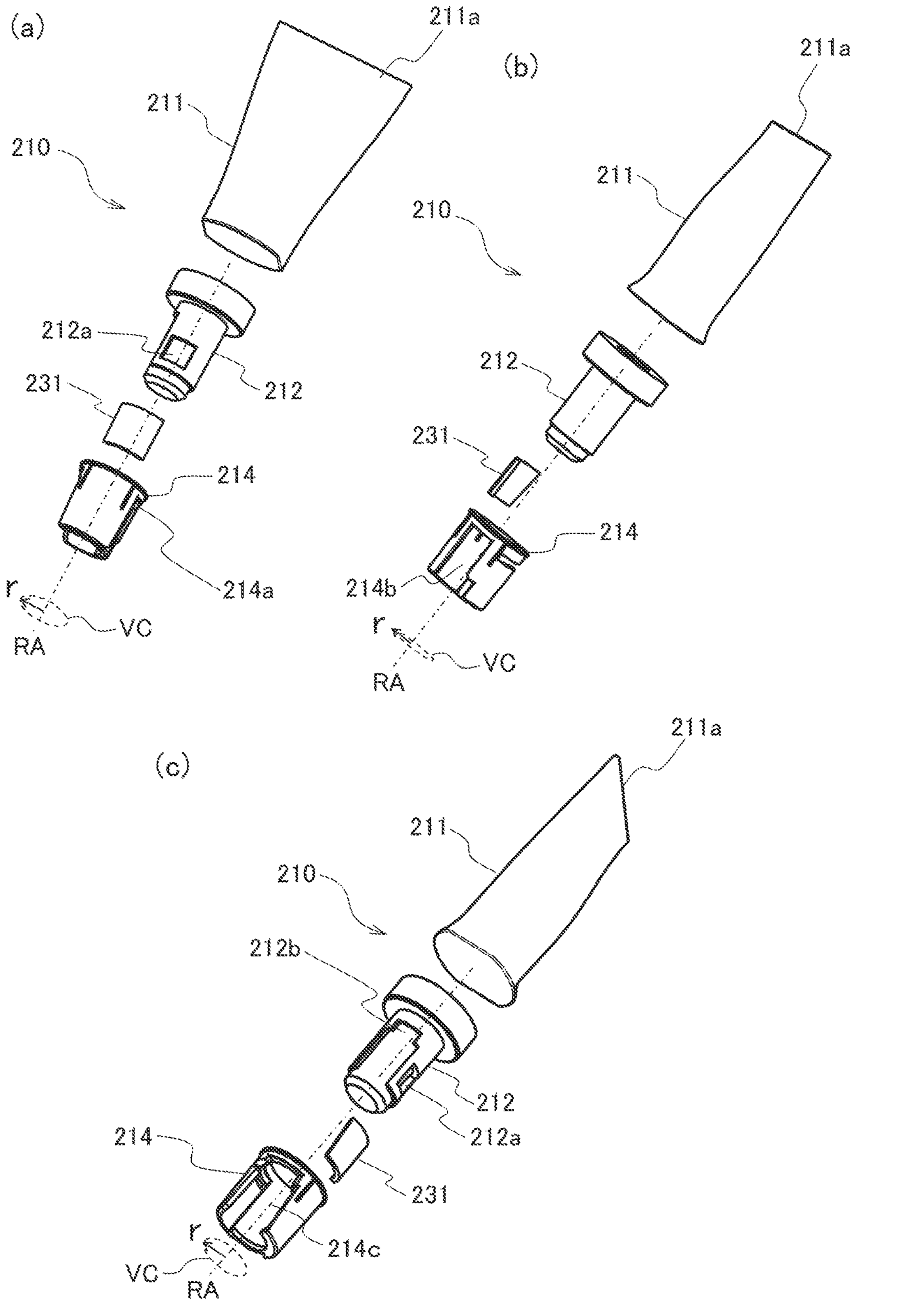

Part (a) of FIG. 12 is an exploded perspective view of the supply pack, part (b) of FIG. 12 is another exploded perspective view of the supply pack, and part (c) of FIG. 12 is a further exploded perspective view of the supply pack.

Figure 13:
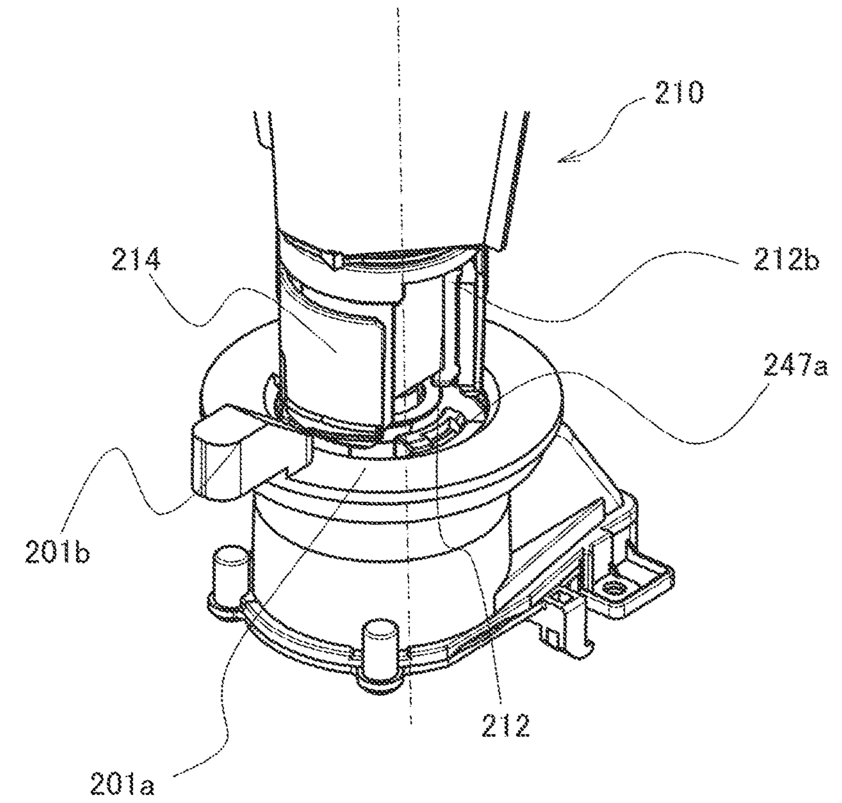
Figure 13:
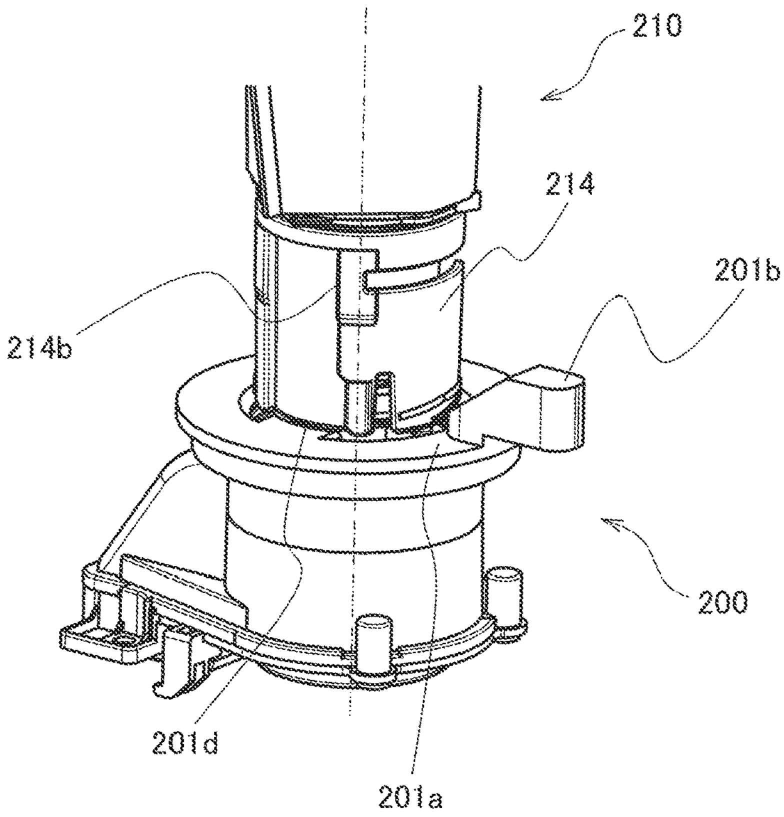

Part (a) of FIG. 13 is a perspective view of the supply pack and the supplying portion immediately before the supply pack is mounted on the supplying portion, and part (b) of FIG. 13 is another perspective view of the supply pack and the supplying portion immediately before the supply pack is mounted on the supplying portion.

Figure 14:
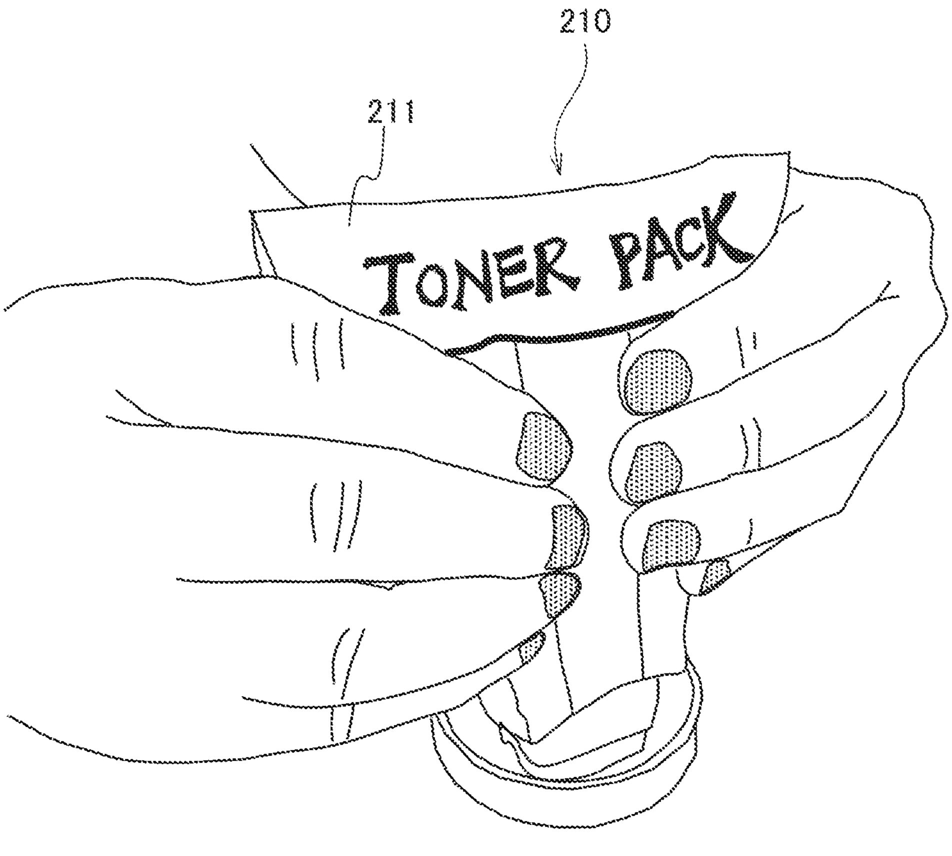

FIG. 14 is a schematic view showing a state in which a user loosens (deforms) the supply pack.

Figure 15:
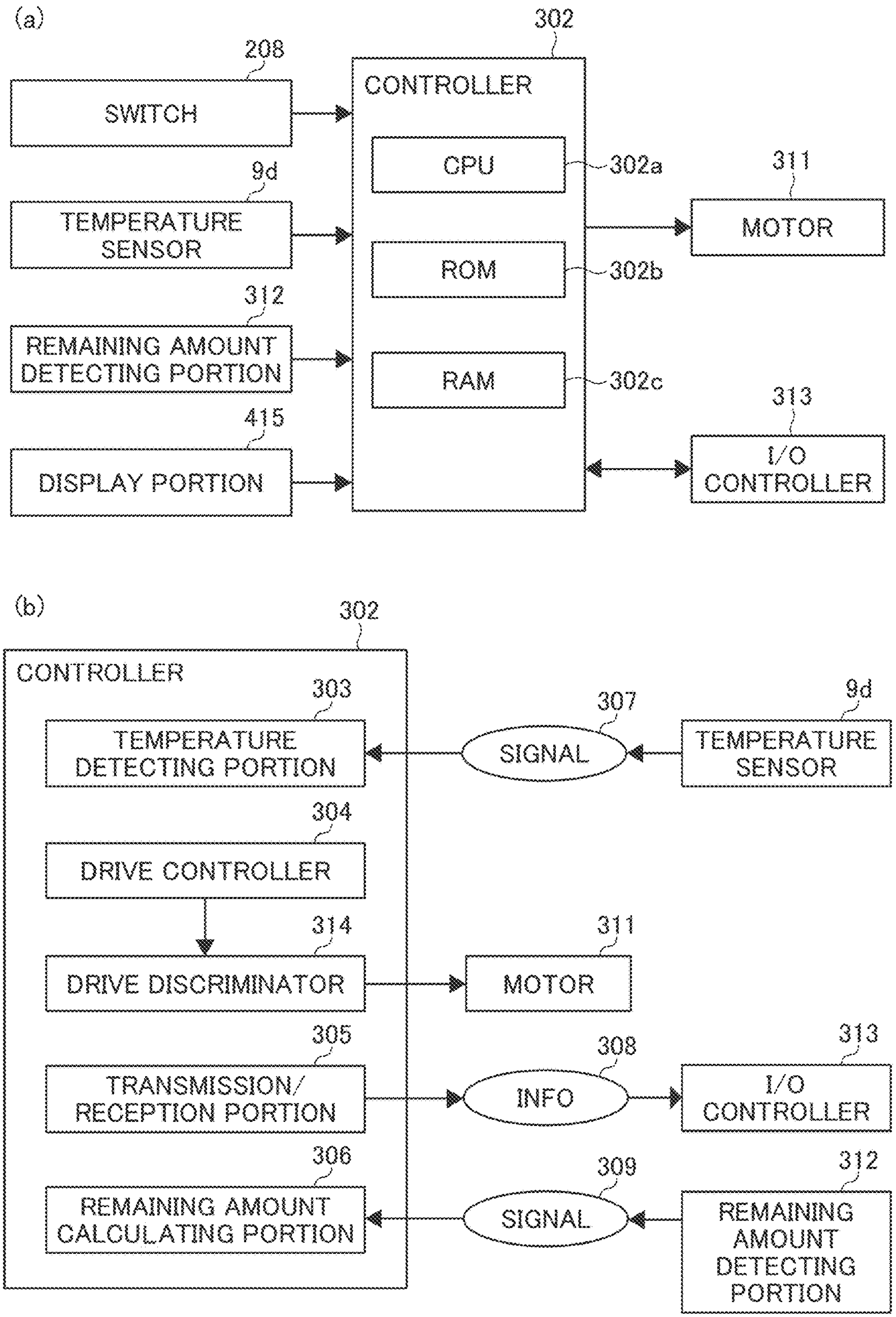

Part (a) of FIG. 15 is a control block diagram showing a hardware constitution of a controller, and part (b) of FIG. 15 is a control block diagram showing a software constitution of the controller.

Figure 16:
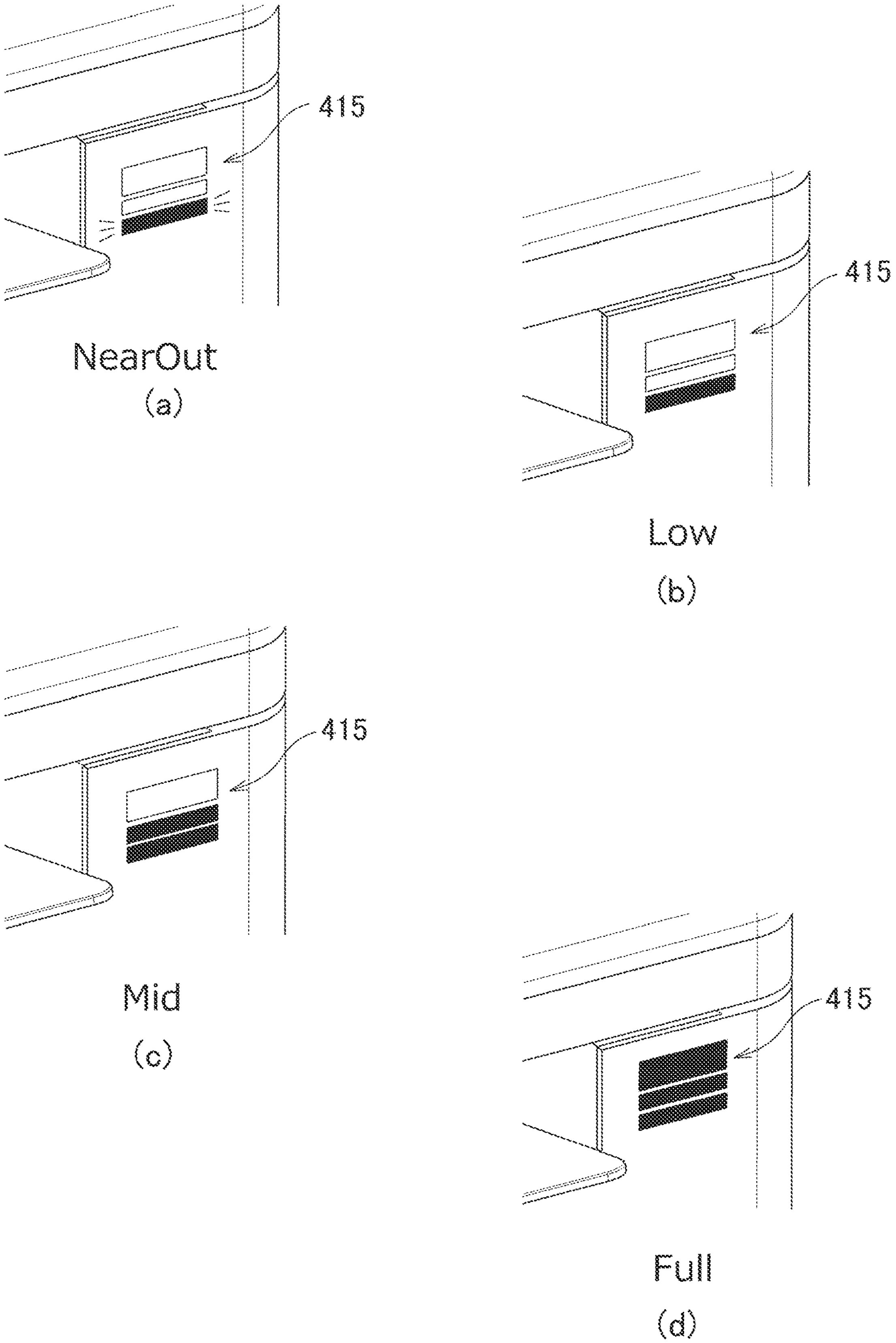

Part (a) of FIG. 16 is a perspective view showing a state in which a display portion shows a NearOut level, part (b) of FIG. 16 is a perspective view showing a state in which the display portion shows a Low level, part (c) of FIG. 16 is a perspective view showing a state in which the display portion shows a Mid level, and part (d) of FIG. 16 is a perspective view showing a state in which the display portion shows a Full level.

Figure 17:
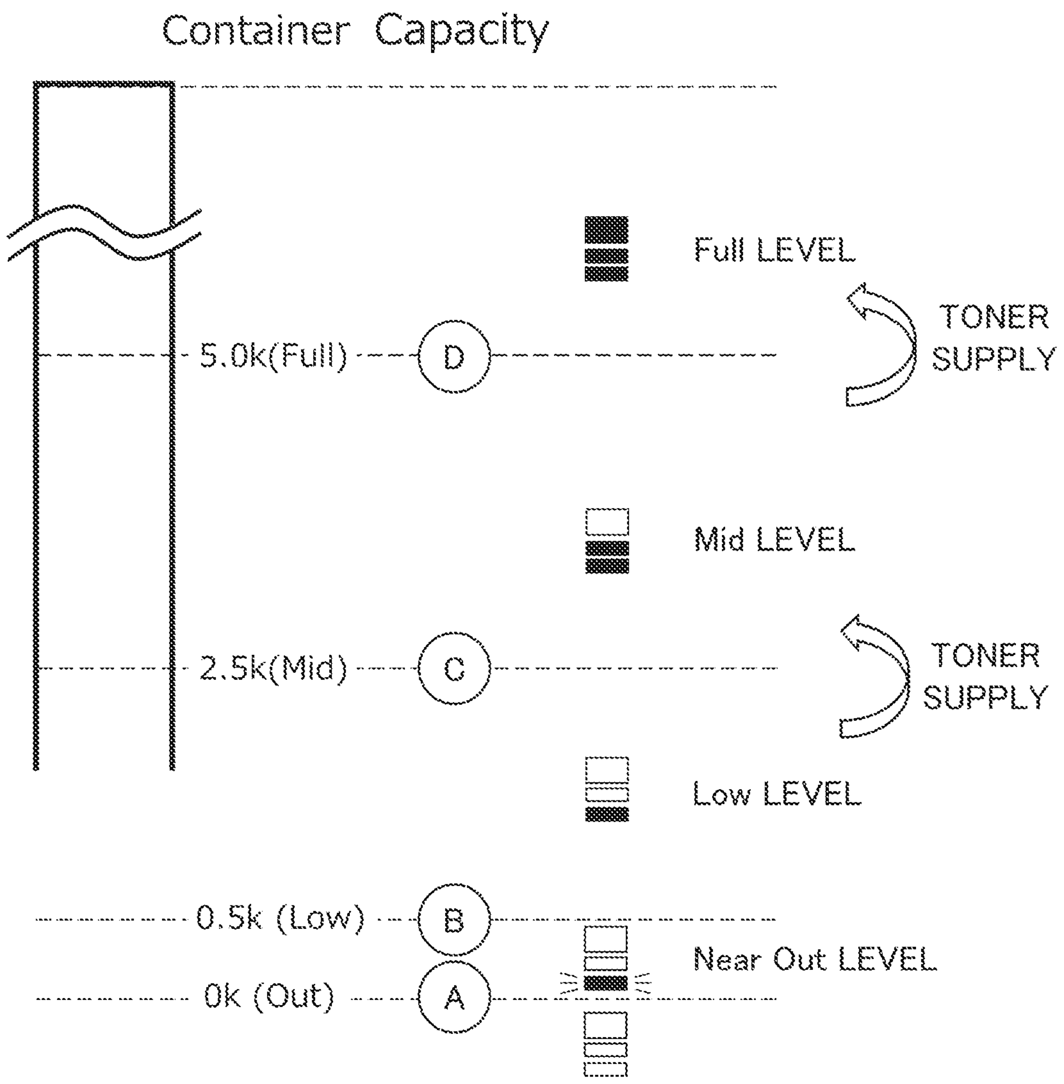

FIG. 17 is a schematic view showing a relationship between a threshold for switching remaining toner amount display and a toner amount of toner in an accommodating portion.

Figure 18:
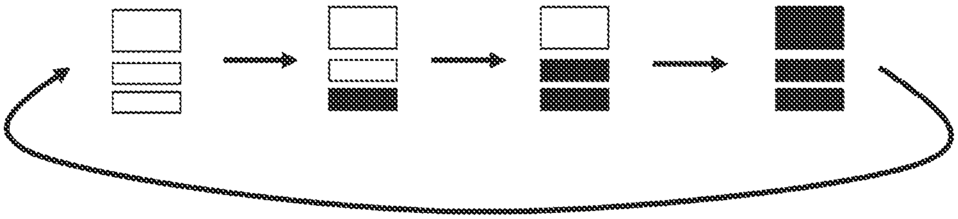
Figure 18:
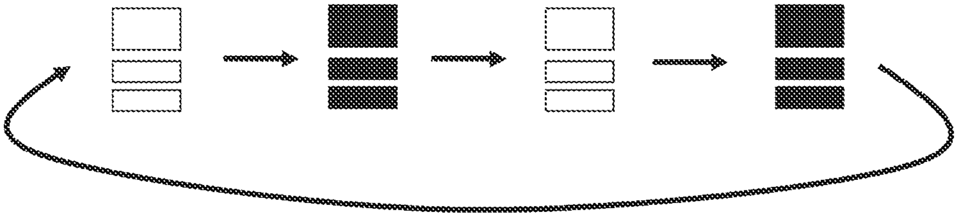

Part (a) of FIG. 18 is a schematic view showing an example of supply mode display in the display portion, and part (b) of FIG. 18 is a schematic view showing another example of the supply mode display in the display portion.

Figure 19:
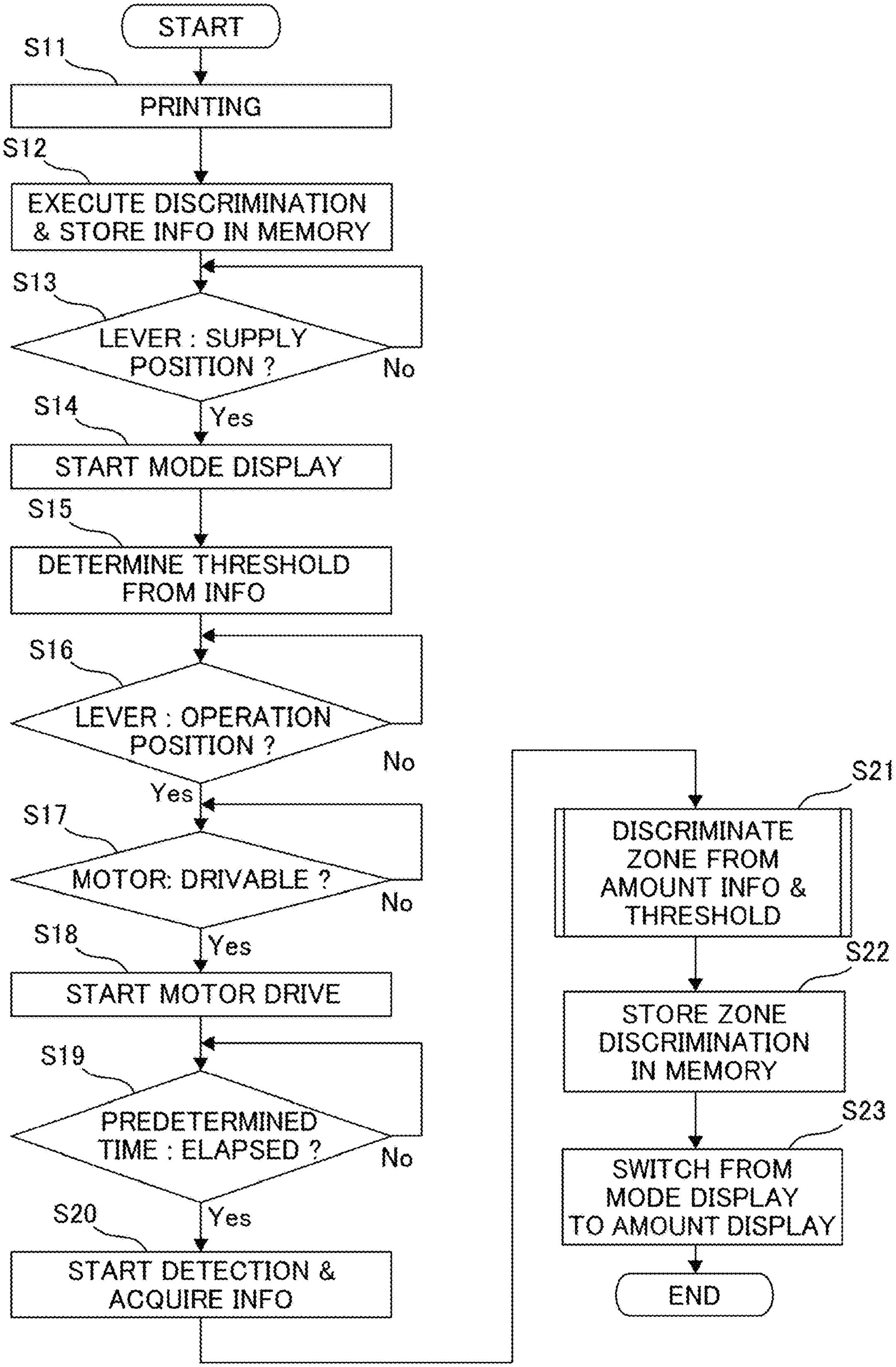

FIG. 19 is a flowchart showing control of the display portion when a supplying operation is performed.

Figure 20:
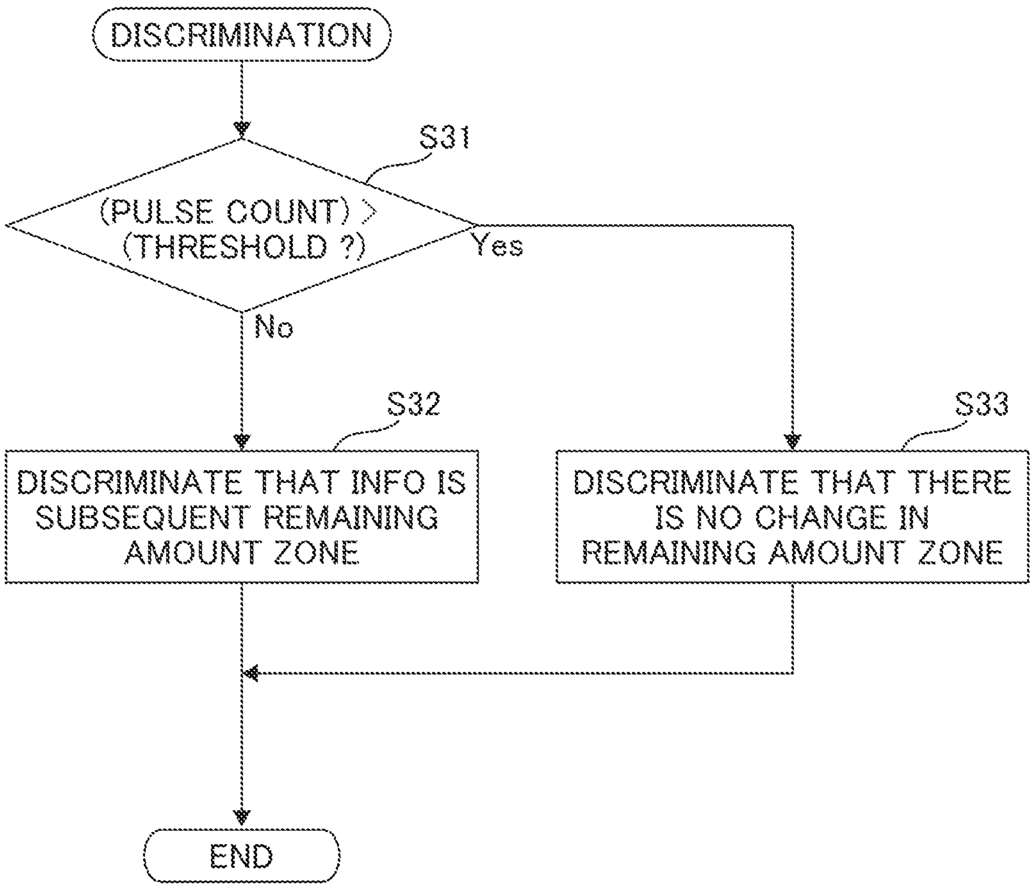

FIG. 20 is a flowchart showing a discriminating method of a remaining amount zone after supply.

Figure 21:
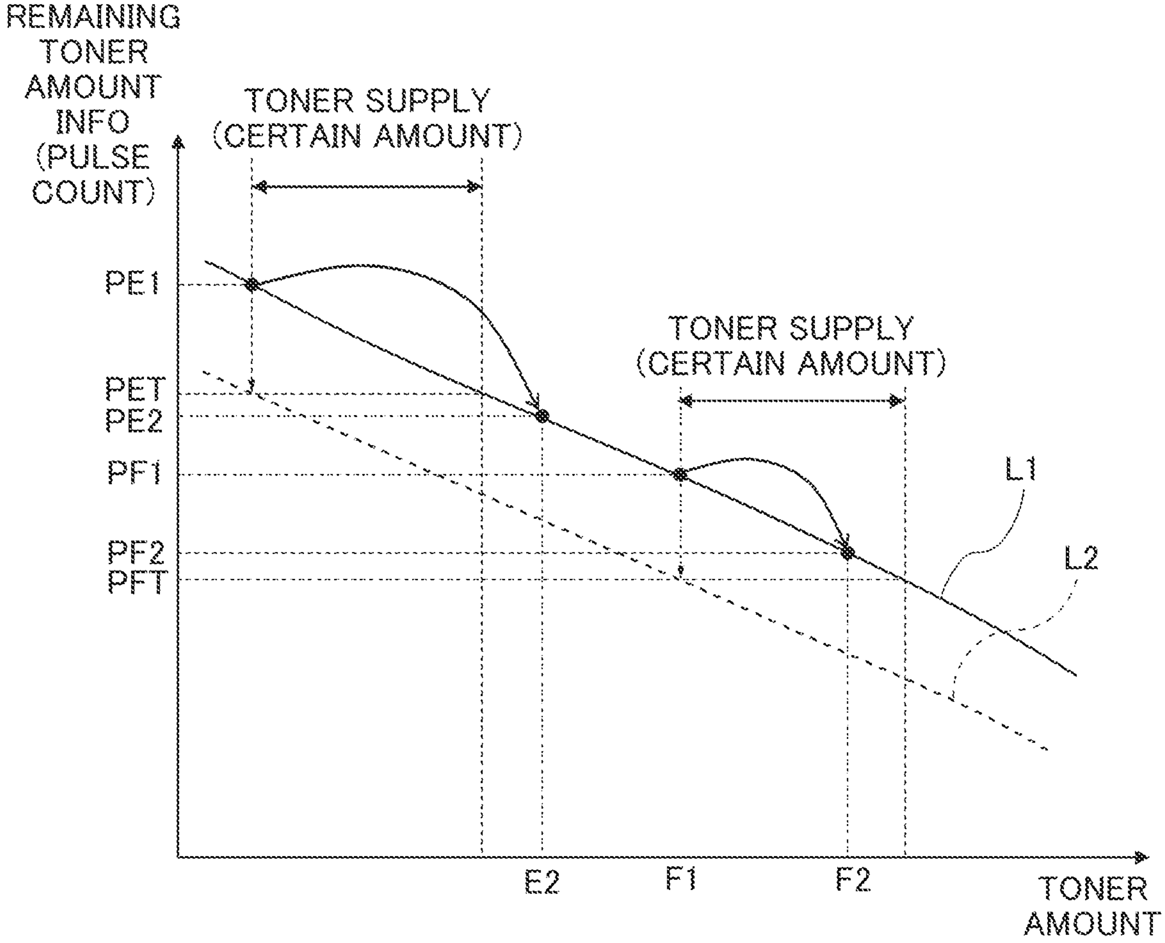

FIG. 21 is a graph showing a relationship between the toner amount of the toner in the accommodating portion and a pulse count based on a detection result of a recording material detecting portion.

Figure 22:
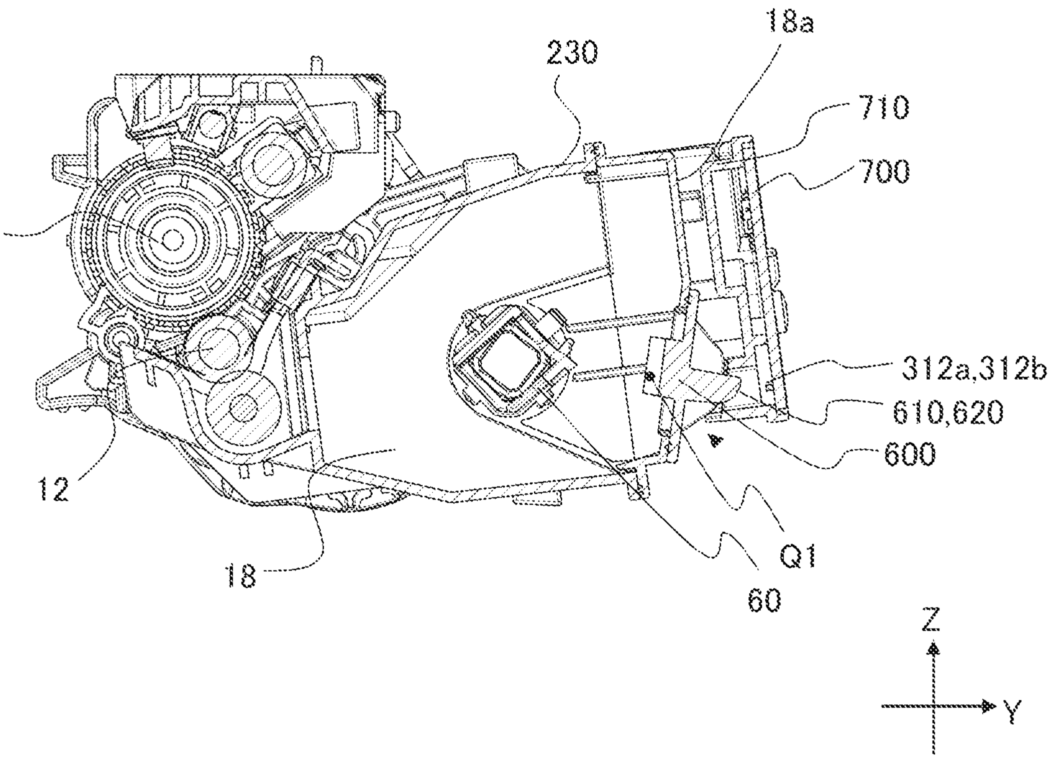
Figure 22:
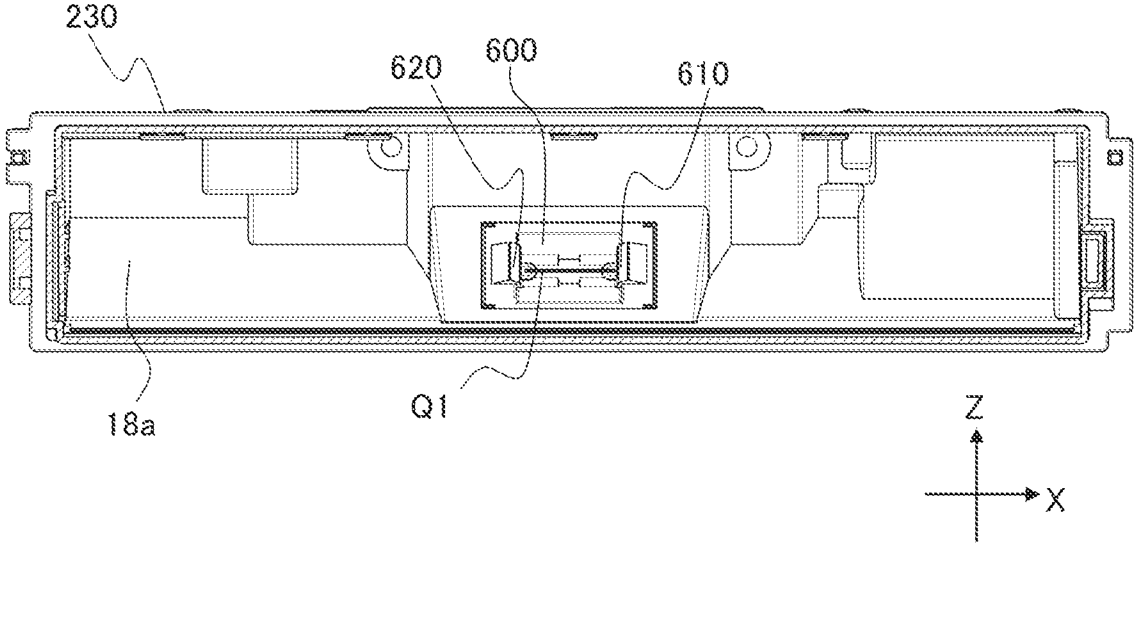

Part (a) of FIG. 22 is a sectional view of the developing container perpendicular to a longitudinal direction of the developing container, and part (b) of FIG. 22 is a sectional view of the developing container along the longitudinal direction.

DESCRIPTION OF THE EMBODIMENTS

In the following, exemplary embodiments for carrying out the present invention will be described while making reference to the drawings. However, dimensions, materials, shapes, a relative arrangement, and the like of constituent elements described in the following embodiments should be appropriately changed depending on constitutions and various conditions of apparatuses to which the present invention is applied, and the scope of the present invention is not intended to be limited to the following embodiments.

Figure 1:
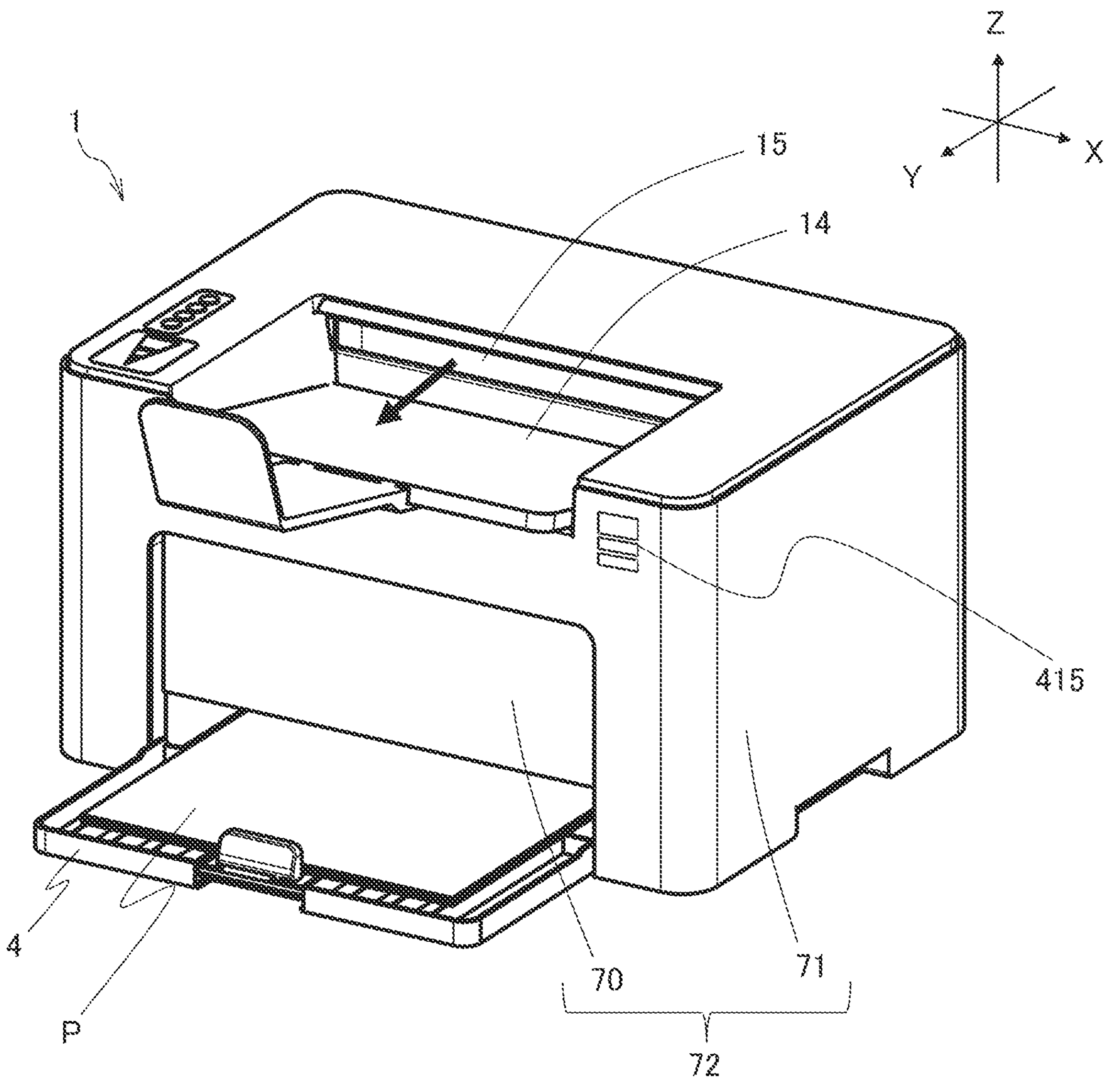
FIG. 1 is a perspective view showing an image forming apparatus according to an embodiment.
Figure 2:
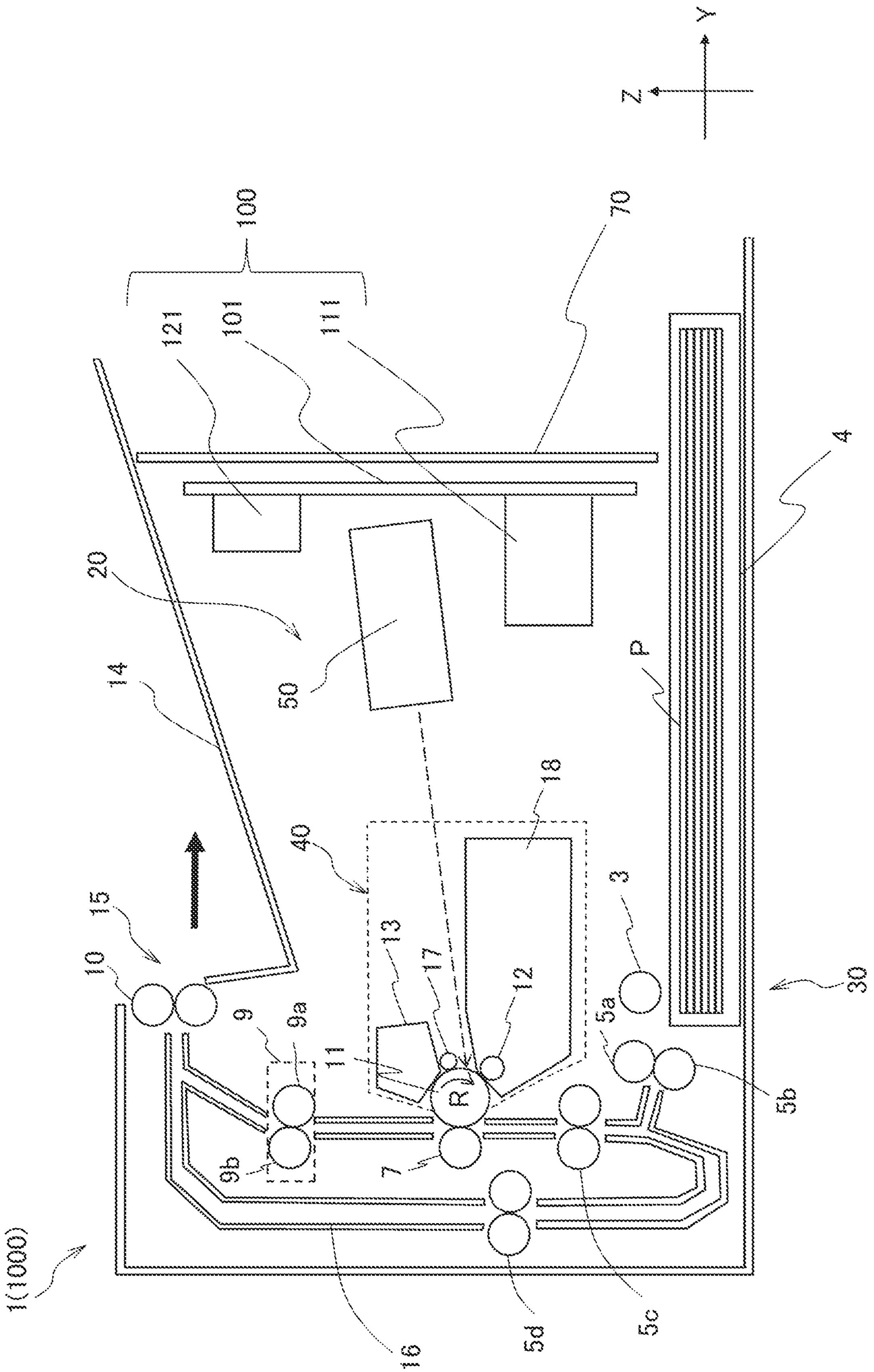
FIG. 2 is a schematic sectional view of the image forming apparatus of the embodiment.

FIG. 1 is a perspective view of an image forming apparatus 1 according to a first embodiment. FIG. 2 is a schematic sectional view of the image forming apparatus 1. The image forming apparatus 1 is a monochromatic printer for forming an image on a recording material on the basis of image information inputted from an external device. As the recording material, various sheet materials different in material including papers such as plain paper and thick paper, a plastic film such as a sheet for an overhead projector, special-shaped sheets such as an envelope and index paper, a cloth, and the like are included.

Further, in the following description, a height direction (to in this case, a vertical direction) of the image forming apparatus 1 in the case where the image forming apparatus 1 is installed on a horizontal surface is referred to as a Z-direction. A direction which crosses the Z-direction and which is parallel to a rotational axis direction (main scan direction) of a photosensitive drum 11 (described later) is referred to as an X-direction. A direction crossing the X-direction and the Z-direction is referred to as a Y-direction. The X-direction, the Y-direction, and the Z-direction may preferably perpendicularly cross each other. Further, for convenience, in the X-direction, a positive (+) side is referred to as a right side, and the negative (−) side is referred to as a left side. In the Y-direction, the positive side is referred to as a front side or a front surface side, and the negative side is referred to as a rear side or a rear surface side. In the Z-direction, the positive side is referred to as an upper side, and the negative side is referred to as a lower side.

[General Structure]

A general structure of the image forming apparatus 1 will be described using FIGS. 1 and 2. Incidentally, the image forming apparatus 1 and a supply pack 2 (described later) constitute an image forming system 1000. As shown in FIG. 2, the image forming apparatus 1 includes an image forming portion 20 for forming a toner image on the recording material, a feeding portion 30 for feeding a recording material P, a fixing portion 9 for fixing the toner image, formed by the image forming portion 20, on the recording material P, and a discharging roller pair 10.

The image forming portion 20 includes a scanner unit 50, a process unit 40 of an electrophotographic type, and a transfer roller 7 for transferring the toner image, formed on the photosensitive drum 11 of the process unit 40, onto the recording material P. The process unit 40 includes the photosensitive drum 11, and as members disposed at a periphery of the photosensitive drum 11, a cleaning unit 13, a charging roller 17, a developing roller 12, and an accommodating portion 18 for accommodating toner. Incidentally, the process unit 40 may be fastened to a casing 72 of the image forming apparatus 1 with screws, and includes a process unit demounted by a service person.

The photosensitive drum 11 as an image bearing member is a photosensitive member molded in a cylindrical shape. The photosensitive drum 11 in this embodiment includes, on a drum-shaped base material molded with aluminum, a photosensitive layer formed with a negatively chargeable organic photosensitive member. Further, the photosensitive drum 11 as the image bearing member is rotationally driven at a predetermined process speed in a predetermined direction (R direction in FIG. 2) by a motor.

The charging roller 17 contacts the photosensitive drum 11 at a predetermined press-contact force and forms a charging portion. Further, a desired charging voltage is applied to the charging roller 17 by a high-charging-voltage power source, so that the charging roller 17 electrically charges a surface of the photosensitive drum 11 uniformly to a predetermined potential. In this embodiment, the photosensitive drum 11 is charged to a negative polarity by the charging roller 17.

The scanner unit 50 irradiates the photosensitive drum 11, by using a polygonal mirror, with laser light corresponding to image information inputted from the external device, so that the surface of the photosensitive drum 11 is subjected to scanning exposure. By this light exposure, an electrostatic latent image depending on the image information is formed on the surface of the photosensitive drum 11. Incidentally, the scanner unit 50 is not limited to a laser scanner device, but for example, an LED exposure device including an LED array in which a plurality of LEDs are arranged along a longitudinal direction of the photosensitive drum 11 may be employed.

The developing roller 12 is rotatably supported by the accommodating portion 18. Further, the developing roller 12 is disposed at an opening of a developing container 230 (see FIG. 5) including the accommodating portion 18 so as to oppose the photosensitive drum 11. Incidentally, the accommodating portion 18 may be provided with a supplying roller for applying the toner as a developer, accommodated in the accommodating portion 18, onto the surface of the developing roller 12.

The process unit 40 in this embodiment uses a contact development type as a development type. That is, a toner layer carried on the developing roller 12 contacts the photosensitive drum 11 at a developing portion (developing region) where the photosensitive drum 11 and the developing roller 12 oppose each other. To the developing roller 12, a developing voltage is applied by a high-developing-voltage power source. Under application of the developing voltage, the toner carried on the developing roller 12 is transferred from the developing roller 12 onto the drum surface in accordance with a potential distribution of the surface of the photosensitive drum 11, so that the electrostatic latent image is developed into a toner image.

Further, the toner in this embodiment is a so-called non-magnetic one-component developer which does not contain a magnetic component and in which the toner is carried on the developing roller 12 principally by an intermolecular force or an electrostatic force (mirror force). However, a one-component developer containing a magnetic component may also be used. Further, in the one-component developer, an additive (for example, wax or silica fine particles) for adjusting flowability and charging performance of the toner is contained in addition to toner particles in some cases. Further, as the developer, a two-component developer constituted by non-magnetic toner and a magnetic carrier may also be used. In the case where the developer having a magnetic property is used, as the developer carrying member, for example, a cylindrical developing sleeve inside of which a magnet is disposed is used.

A fixing portion 9 is of a heat fixing type in which an image fixing process is performed by heating and melting the toner on the recording material. The fixing portion 9 includes a heating roller 9*a* incorporating therein a fixing heater 9*c*, and a pressing roller 9*b* press-contacting the heating roller 9*a*.

The feeding portion 30 includes a cassette 4 on which recording materials P are stacked, and as a conveying portion, a picking-up roller 3, a feeding roller 5*a*, and a separation roller 5*b*. At a part of an end surface of the image forming apparatus on the front side, a front cover 70 is provided and covers a circuit board 100. The casing 72 includes the front cover 70, a discharge tray 14, and an outer casing cover 71 constituting an outer casing of the image forming apparatus 1 other than the front cover 70 and the discharge tray 14. The casing 72 is provided with a discharge opening 15 through which a sheet discharged to the discharge tray 14 is discharged.

As shown in FIG. 2, the image forming apparatus 1 includes the circuit board 100. The circuit board 100 is constituted by a wiring board 101 formed with an insulating member and electronic components 111 and 121 soldered or otherwise connected to the wiring board 101. On or inside a board of the wiring board 101, wiring of an electroconductor is provided, and therefore, the electronic components 111 and 121 are electrically connected to each other. The circuit board 100 has functions such that an AC current supplied from an outside of the image forming apparatus is converted into a DC current and such that an input voltage is converted for obtaining a predetermined voltage value necessary for an image forming process.

The circuit board 100 is disposed in a direction such that a surface of the wiring board 101 on which the electronic components 111 and 121 are mounted crosses a discharging direction. Further, the wiring board 101 is provided between the front cover 70 and the scanner unit 50 with respect to the discharging direction. The electronic components 111 and 121 are provided on the surface of the wiring board 101 on a side opposing the scanner unit 50.

[Image Forming Mode]

An operation in an image forming mode of the image forming apparatus 1 will be described. The image forming mode in this embodiment is, as shown in FIG. 1 and part (a) of FIG. 3, a mode in which an image is formed on the recording material P in a state in which the discharge tray 14 is in a closed position. When an instruction of image formation is inputted to the image forming apparatus 1, on the basis of the image information inputted from an external computer connected to the image forming apparatus 1, an image forming process by the image forming portion 20 is started. The scanner unit 50 emits the laser light toward the photosensitive drum 11 on the basis of the inputted image information. At this time, the photosensitive drum 11 is charged in advance by the charging roller 17, and is irradiated with the laser light, so that the electrostatic latent image is formed on the photosensitive drum 11. Thereafter, this electrostatic latent image is developed by the developing roller 12, so that the toner image is formed on the photosensitive drum 11.

In parallel to the above-described image forming process, the pick-up roller 3 of the feeding portion 30 sends the recording material P supported by the cassette 4. The recording material P is separated one by one by the feeding roller 5*a* and the separation roller 5*b*, and is conveyed to a conveying roller pair 5. Then, by the conveying roller pair 5*c*, the recording material P is conveyed toward a transfer nip formed by a transfer roller 7 and the photosensitive drum 11.

To the transfer roller 7, a transfer voltage power is applied from a high-transfer-voltage power source, so that the toner image carried on the photosensitive drum 11 is transferred onto the recording material P conveyed by the device conveying roller pair 5*c*. The recording material P onto which the toner image is transferred is conveyed to the fixing portion 9, where the toner image is heated and pressed when the recording material P passes through a nip between the heating roller 9*a* and the pressing roller 9*b* of the fixing portion 9. By this, toner particles are melted and are thereafter stuck, so that the toner image is fixed on the recording material P. The recording material P passed through the fixing portion 9 is discharged through the discharge opening 15 to an outside of the image forming apparatus 1 (outside of the printer) by a discharging roller pair 10, so that the discharged recording materials P are stacked on the discharge tray 14.

In the case where images are formed on double (both) sides of the recording material P, the discharging roller pair 10 subjects the recording material P, on which the image is formed on the first surface (side), to switch-back, and guides the recording material P to a double-side conveying passage 16.

The recording material P conveyed to the double-side conveying passage 16 is conveyed toward the transfer roller 7 again by a double-side conveying roller pair 5*d*. The recording material P is discharged to the outside of the image forming apparatus 1 by the discharging roller pair 10 after the image is formed on a second surface (side) by the transfer roller 7. Further, the toner remaining on the photosensitive drum 11 after the toner images are transferred on the recording material P is removed by a cleaning unit 13.

[Supplying Portion]

Next, a supplying portion (mounting portion) 200 will be described using part (a) of FIG. 3 to part (c) of FIG. 7. The discharge tray 14 is supported so as to be openable and closable between a closed position where the recording material P is capable of being stacked and the operation in the image forming mode is capable of being executed as shown in part (a) of FIG. 3 and an open position where the discharge tray 14 is open as shown in part (b) of FIG. 3. An unshown open/close detecting portion can detect which position the discharge tray 14 is positioned of the open position and the closed position. When the discharge tray 14 is moved to the open position, a top surface portion 240 and the supplying portion 200 disposed adjacent to the top surface portion 240 are exposed. The supplying portion 200 is constituted so that a supply pack 210 as a toner container (described later) is detachably mountable (mountable) to the supplying portion 200. The image forming apparatus 1 is constituted so that a user or the service person is capable of supplying the toner from the outside into the image forming apparatus 1 without dismounting the developing container 230 from the casing 72 (see FIG. 1).

FIG. 4 is a sectional view of the developing container 230 of the image forming apparatus 1. FIG. 5 is a schematic view of the image forming apparatus, as viewed from above, in a state in which the outer casing is discharged. FIG. 6 is a perspective view of the developing container 230. Incidentally, in FIG. 6, a lever 201 of the supplying portion 200 and a part of a member attached thereto are omitted.

As shown in FIGS. 4 to 6, the developing container 230 includes the accommodating portion 18 and the supplying portion 200.

The supplying portion 200 includes a cylindrical passage member 202 and a main assembly shutter 206 (see part (b) of FIG. 7). The passage member 202 includes an extended portion **202*b* extended to the accommodating portion 18 and a side surface opening 202*a* connected to the extended portion 202*b*. The toner discharged from the supply pack 210 mounted on the supplying portion 200 passes through a main assembly shutter opening 206*a*, the side surface opening 202*a* of the passage member 202, and the extended portion 202*b*, and is supplied to the accommodating portion 18**.

The extended portion **202*b* is connected to the accommodating portion 18 on one end side with respect to the longitudinal direction of the developing container 230, i.e., the X-direction. Inside the accommodating portion 18, as shown in FIG. 4, a stirring member 60 rotatable about a rotation shaft 60*a* extending in the X-direction is provided. The stirring member 60 includes a blade portion 60*b* fixed to the rotation shaft 60*a*, and is driven and rotated by a motor 311 (see FIG. 15), so that the stirring member 60 not only smoothens the toner in the accommodating portion 18 supplied from the supply pack 210 by stirring the toner but also conveys the toner toward the developing roller 12. Incidentally, in this embodiment, the stirring member 60 is constituted by the rotation shaft 60*a* and the blade portion 60*b*, but as a constitution in which the toner is supplied and extended over a full length of the accommodating portion 18**, a helical-shaped stirring member may also be used.

The stirring member 60 has a function of circulating, in the accommodating portion 18, the toner which is not used for development and which is scraped off from the developing roller 12 and of uniformizing the toner in the accommodating portion 18. Incidentally, the form of the stirring member 60 is not limited to a rotation form. For example, a stirring member of a swing form may be employed.

Further, in addition to the stirring member 60, another stirring member may be provided inside the accommodating portion 18.

Further, on a side surface **18*a* of the accommodating portion 18 positioned on a side opposite from the developing roller 12, a remaining amount detecting portion (remaining toner amount detecting portion) 312 for detecting a toner amount in the accommodating portion 18 is provided, and the remaining amount detecting portion 312 includes a light emitting portion 312*a* and a light receiving portion 312*b*. Specifically, as shown in parts (a) and (b) of FIG. 22, onto the side surface 18*a* of the developing container 230, a substrate 700 is mounted via a substrate holding member 710. Further, onto the side surface 18*a*, a light guiding member 600 is mounted and includes a light emitting side-light guide body 610 and a light receiving side-light guide body 620. To the substrate 700, the light emitting portion 312*a* and the light receiving portion 312*b* are assembled, and are arranged and disposed in the X-direction. The light emitting side-light guide body 610 guides the light, emitted from the light emitting portion 312*a*, into the accommodating portion 18 of the developing container 230**.

The light receiving side-light guide body 620 guides the light, to the light receiving portion **312*b*, emitted from the light emitting side-light guide body 610 and entering the light guiding member 600 via an optical path Q1 in the accommodating portion 18. That is, the light emitting portion 312*a* and the light receiving portion 312*b* form the optical path Q1 inside the accommodating portion 18 by guiding the light by the light guiding member 600. The optical path Q1 extends in the X-direction. Incidentally, the light emitting portion 312*a* and the light receiving portion 312*b* may be prepared by disposing a light emitting element and a light receiving element inside the accommodating portion 18**.

Further, the light emitting portion **312*a* and the light receiving portion 312*b* are provided at a central portion of the accommodating portion 18 with respect to the X-direction. Specifically, the light emitting portion 312*a* and the light receiving portion 312*b* are disposed in a region corresponding to a laser passing space SP (see FIG. 5) with respect to the X-direction. The laser passing space SP is a space through which the laser light emitted from the scanner unit 50 toward the photosensitive drum 11 passes. Thus, by providing the light emitting portion 312*a* and the light receiving portion 312*b* at the central portion of the accommodating portion 18, the remaining toner amount of the toner in the accommodating portion 18 can be satisfactorily detected. That is, at an end portion of the accommodating portion 18 with respect to the X-direction, the developer (toner) is localized in some instances, but a degree of localization of the developer at the central portion of the accommodating portion 18** is small, so that a practical remaining toner amount can be detected at the central portion.

Incidentally, in this embodiment, an LED is used as the light emitting portion **312*a*, and a phototransistor put in an ON state by the light from the LED is used as the light receiving portion 312*b*, but the present invention is not limited thereto. For example, a halogen lamp or a fluorescent lamp may be used as the light emitting portion 312*a*, and a photo-diode or an avalanche photodiode may be used as the light receiving portion 312*b***.

The light receiving portion **312*b* which is the phototransistor receives the light emitted from the light emitting portion 312***a* and outputs a single (current) depending on a received light quantity. This signal is converted into a voltage, and is inputted to a controller 302 (see FIG. 15). That is, the light receiving portion 312*b* changes an output value on the basis of an amount of the toner (developer) accommodated in the accommodating portion 18.

The controller 302 discriminates whether or not the light receiving portion 312*b* receives the light from the light emitting portion 312*a*, on the basis of an inputted voltage level. The controller 302 calculates a toner amount (developer amount) in the accommodating portion 18 on the basis of a length of a time in which the light receiving portion 312*b* receives associated light when the toner in the accommodating portion 18 is stirred for a certain time by the stirring member 60. That is, a ROM 302*b* of the controller 302 in part (a) of FIG. 15 preliminarily stores a table capable of outputting a remaining toner amount from a light receiving time when the toner is conveyed by the stirring member 60, and the controller 302 predicts and calculates the remaining toner amount on the basis of this table.

Specifically, as shown in FIG. 4, the optical path Q1 of the remaining amount detecting portion 312 is set so as to overlap with a rotation locus TC of the stirring member 60 as viewed in an axial direction of a rotation shaft of the stirring member 60. In other words, the light emitted from the light emitting portion 312*a* of the remaining amount detecting portion 312 passes through the inside of the accommodating portion 18 in the rotation locus TC of the stirring member 60. Then, a time in which the optical path Q1 is blocked by the toner conveyed by the stirring member 60 when the stirring member 60 is rotated by one turn, i.e., a time the light receiving portion 312*b* does not receive the light from the light emitting portion 312*a* changes depending on the remaining toner amount.

That is, when the remaining toner amount is large, the optical path Q1 is liable to be blocked by the toner, and therefore, a light receiving time of the light receiving portion 312*b* becomes short. On the other hand, when the remaining toner amount is small, the light receiving time of the light receiving portion 312*b* becomes long. Accordingly, the controller 302 is capable of discriminating a remaining toner amount level of the toner in the accommodating portion 18 on the basis of the light receiving time of the light receiving portion 312*b* as described above.

Incidentally, a detecting and estimating method of the remaining toner amount is not limited to the above-described method (type), but it is possible to employ remaining toner amount detecting and estimating methods of various well-known types. For example, two or more metal plates or electroconductive resin sheets which extend in a longitudinal direction of the developing roller 12 are disposed on an inner wall of the accommodating portion 18, and electrostatic capacity between the two metal plates or the two electroconductive resin sheets is measured, so that the remaining toner amount may be detected and estimated. Or, a load cell in the form of supporting the developing container 230 from below is provided, and on the basis of a weight measured by the load cell, the remaining toner amount may be calculated.

A specific constitution of the supplying portion 200 on which the supply pack 210 is mounted will be described. Parts (a) and (b) of FIG. 7 are perspective views of the supplying portion 200 as viewed in the same direction. Part (c) of FIG. 7 is a perspective view of the supplying portion 200 as viewed from an angle different from an angle in part (a) of FIG. 15. Parts (a) and (b) of FIG. 8 are exploded perspective views of the supplying portion 200.

The supplying portion 200 includes, as shown in parts (a) and (b) of FIG. 8, the lever (operating portion) 201, a rotation restricting member 247, a cover 248, a sealing member 243, the main assembly shutter 206, and the passage member 202. The main assembly shutter 206 is constituted so as to be rotatable (movable) about a rotational axis RA relative to the passage member 202. The main assembly shutter 206 is disposed inside the cylindrical passage member 202 and is provided with the main assembly shutter opening 206*a*. Further, the main assembly shutter 206 is provided with a main assembly shutter engaging portion 206*b* engageable with a container shutter portion-to-be-engaged 214*b* of a container shutter 214 (described later). When a virtual circle about the rotational axis RA is a virtual circle VC, the main assembly shutter engaging portion 206*b* is a projected portion projected inward in a radial direction r of the virtual circle VC.

In the case where the main assembly shutter 206 is positioned in a closed position (second closed position) shown in part (a) of FIG. 7, the main assembly shutter opening 206*a* and the side surface opening 202*a* (see part (b) of FIG. 8) of the passage member 202 do not overlap with each other. That is, the main assembly shutter opening 206*a* and the side surface opening 202*a* of the passage member 202 do not communicate with each other. For this reason, the side surface opening 202*a* is shielded by the main assembly shutter 206, so that the toner is not discharged to the extended portion 202*b* of the passage member 202. When the main assembly shutter 206 is positioned in an open position (second open position) shown in part (b) of FIG. 7, the main assembly shutter opening 206*a* and the side surface opening 202*a* of the passage member 202 overlap with each other. That is, the main assembly shutter opening 206*a* and the side surface opening 202*a* of the passage member 202 communicate with each other. For this reason, the toner supplied from the supply pack 210 mounted on the supplying portion 200 passes through the main assembly shutter opening 206*a* and the side surface opening 202*a* and becomes dischargeable to the extended portion 202*b* of the passage member 202.

Although described specifically later, the main assembly shutter 206 is moved (rotated) between the closed position and the open position by rotating the lever 201 in a state in which the supply pack 210 is mounted on the supplying portion 200. That is, the main assembly shutter 206 is moved from the closed position shown in part (a) of FIG. 7 to the open position shown in part (b) of FIG. 7 by rotating the lever 201 counterclockwise 90 degrees by the user.

At a periphery of the main assembly shutter opening 206*a* on an inner peripheral surface side of the main assembly shutter 206, the sealing member 243 is provided on the main assembly shutter 206. The sealing member 243 is provided with a seal opening 243*a*. The sealing member 243 is provided on the main assembly shutter 206 so that the seal opening 243*a* overlaps with the main assembly shutter opening 206*a*. When the main assembly shutter 206 is in the open position, the sealing member 243 seals a gap between the main assembly shutter 206 and a periphery of an inserting portion opening 212*a* of an inserting portion 212 of the supply pack 210 (described later).

The rotation restricting member 247 is fixed to the passage member 202 and is provided inside the main assembly shutter 206. The rotation restricting member 247 includes a rotation restricting portion 247*a* for restricting rotation of the inserting portion 212 about the rotational axis RA in engagement with a rotation-restricted portion 212*b* of the inserting portion 212 of the supply pack 210 (described later).

The lever 201 includes a ring portion 201*a* provided with an inserting opening through which the inserting portion 212 of the supply pack 210 is inserted, and includes a gripping portion 201*b* provided integrally with the ring portion 201*a*. The lever 201 includes a lever engaging portion 201*d* projecting inward in the radial direction r of the virtual circle VC from the inner peripheral surface forming the inserting opening 201*e*. As shown in part (c) of FIG. 7, the lever engaging portion 201*d* as an engaging portion is in the same phase as the main assembly shutter engaging portion 206*b* with respect to a circumferential direction of the virtual circle VC when the main assembly shutter 206 is in the closed position. In other words, the lever engaging portion 201*d* overlaps with the main assembly shutter engaging portion 206*b* as viewed in the rotational axis direction RA when the main assembly shutter 206 is in the closed position. The cover 248 is fixed to the passage member 202 via the main assembly shutter 206, and as shown in part (a) of FIG. 7, the cover 248 is a member for covering the main assembly shutter opening 206*a* when the main assembly shutter 206 is in the closed position.

When the image is formed on the recording material P, the toner in the accommodating portion 18 is stirred by the stirring member 60 (see FIG. 4), and the side surface opening 202*a* is shielded by the main assembly shutter 206 so that the toner does not leak out through the side surface opening 202*a* of the passage member 202. Accordingly, during the image formation, the lever 201 is positioned in an operation position (first position) shown in part (a) of FIG. 7 so that the main assembly shutter 206 is positioned in the closed position. On the other hand, when the toner is supplied from the supply pack 210 (described later) to the accommodating portion 18, there is a need to open the side surface opening 202*a*. Accordingly, during the toner supply, the lever 201 is positioned in a supplying position (second position) shown in part (b) of FIG. 7, so that the main assembly shutter 206 is positioned in the open position.

Parts (a) and (b) of FIG. 9 are side views each showing the lever 201 and a switch 208 (detecting portion). The lever 201 includes, as shown in part (a) of FIG. 8 and part (a) of FIG. 9, a rib-to-be-detected 201*c* formed integrally with the ring portion 201*a*. Below the ring portion 201*a*, the switch 208 as a sensor is disposed. When the lever 201 is positioned in the operation position, the switch 208 is in an OFF state without contacting the rib-to-be-detected 201*c*.

When the lever 201 is positioned in the supply position, the switch 208 contacts the rib-to-be-detected 201*c* and is in an ON state.

Thus, the switch 208 is turned off (OFF state) or on (ON state), so that it is possible to detect that the lever 201 is positioned in the operation position or the supplying position. Further, the switch 208 is switched from the OFF state to the ON state, so that it is possible to detect that the lever 201 was moved from the operation position to the supplying position. Further, the switch 208 is switched from the ON state to the OFF state, so that it is possible to detect that the lever 201 was moved from the ON state to the OFF state.

[Supply Pack]

A constitution of the supply pack 210 will be described using part (a) of FIG. 11 and part (c) of FIG. 12. Parts (a) and (b) of FIG. 11 are perspective views of the supply pack 210 as viewed from angles different from each other. Parts (a), (b), and (c) of FIG. 12 are exploded perspective views of the supply pack 210 as viewed from angles different from each other. Incidentally, in part (a) of FIG. 11, the inserting portion opening 212*a* as an opening is covered with the container shutter 214 and is not actually seen, and therefore is shown by a broken line.

As shown in part (a) of FIG. 11 to part (c) of FIG. 12, the supply pack 210 includes a pouch 211, the inserting portion 212 (end portion member), the container shutter 214 as a shutter, and a container shutter seal 231. The rotational axis RA is a rotational axis when the container shutter 214 is rotated relative to the inserting portion 212.

The pouch 211 is a container formed in a bag shape by subjecting a polypropylene sheet to pouch processing. The pouch 211 has a flat shape toward a side opposite from the inserting portion 212, and includes, at an end thereof, a pouch end portion 211*a* extending in a direction perpendicular to the rotational axis RA. Incidentally, in this embodiment, although the pouch is used as a toner accommodating portion of the supply pack 210, a bottle made of resin or a container made of paper, vinyl, or the like may be used.

The inserting portion 212 is a cylindrical member capable of being inserted into the inserting opening 201*e* of the lever 201, and is provided with the inserting portion opening 212*a* on a side surface extending in the direction of the rotational axis RA. The inserting portion 212 is provided at an end portion of the pouch 211 with respect to the direction of the rotational axis RA, and is a member for discharging the toner in the pouch 211 to an outside of the supply pack 210 through the inserting portion opening 212*a*. The inserting portion 212 further includes the rotation-restricted portion 212*b*. The rotation-restricted portion 212*b* is engaged with the rotation restricting portion 247*a* of the rotation restricting member 247, so that rotation of the inserting portion 212 about the rotational axis RA is restricted.

The container shutter 214 is a cylindrical member constituted so as to be concentric with the inserting portion 212. The container shutter 214 is provided rotatably about the rotational axis RA relative to the inserting portion 212 on an outside of the inserting portion 212 with respect to the radial direction r of the virtual circle VC. Further, the container shutter 214 is constituted so as to be moved (rotated) between a closed position (first position) where the container shutter 214 closes the inserting portion opening 212*a* and an open position (second position) where the container shutter 214 opens the inserting portion opening 212*a*.

The container shutter 214 is provided with a container shutter opening 214*c* (opening). When the container shutter 214 is in the open position, the container shutter opening 214*c* and the inserting portion opening 212*a* overlap and communicate with each other. At this time, the toner becomes dischargeable from the inside of the supply pack 210 to the outside of the supply pack 210 through the container shutter opening 214*c* and the inserting portion opening 212*a*. When the container shutter 214 is in the closed position, the inserting portion opening 212*a* is closed by the container shutter 214. At this time, the toner is not discharged from the supply pack 210 to the outside of the supply pack 210. When the supply pack 210 is not mounted on the image forming apparatus 1, the container shutter 214 is in the closed position. Further, when the container shutter 214 is in the closed position, the rotation-restricted portion 212*b* of the inserting portion 212 is exposed from the container shutter opening 214*c*. This will be described later.

On an outer peripheral surface of the container shutter 214, a container shutter portion-to-be-engaged 214*b* engageable with the lever engaging portion 201*d* of the lever 201 and the main assembly shutter engaging portion 206*b* of the main assembly shutter 206 when the supply pack 210 is mounted on the supplying portion 200 is provided. The container shutter portion-to-be-engaged 214*b* as a portion-to-be-engaged is a recessed portion recessed from the outer peripheral surface of the container shutter 214 toward the inside of the container shutter 214 in the radial direction r of the virtual circle VC and extends to an end of the container shutter 214 on a side remote from the pouch 211 with respect to the direction of the rotational axis RA. The container shutter portion-to-be-engaged 214*b* receives a force from the lever engaging portion 201*d* of the lever 201 in a rotational direction about the rotational axis RA, so that the container shutter 214 is rotated relative to the inserting portion 212. Incidentally, the container shutter portion-to-be-engaged 214*b* is not required to be the recessed portion when a constitution in which the container shutter 214 is rotated by rotation of the lever 201 in engagement with the lever 201 is employed.

The container shutter seal 231 is provided on the inner peripheral surface of the container shutter 214. The container shutter seal 231 seals between a periphery of the inserting portion opening 212*a* of the inserting portion 212 and the container shutter 214 when the container shutter 214 is in the closed position.

[Mounting of Supply Pack and Supply]

Next, a mounting method of the supply pack 210 on the supplying portion 200 and a toner supplying method using the supply pack 210 will be described using part (a) of FIG. 13 to FIG. 14. Parts (a) and (b) of FIG. 13 are perspective views of the supplying portion 200 of the image forming apparatus 1 and the supply pack 210 immediately before being mounted on the supplying portion 200 as viewed in different directions. FIG. 14 is a perspective view showing a state in which the user grips the pouch 211 with user's hands.

As shown in parts (a) and (b) of FIG. 13, when the supply pack 210 is mounted on the supplying portion 200 of the image forming apparatus 1, there is a need that the supply pack 210 is aligned with the supplying portion 200 in two positions. This alignment is alignment with respect to the rotational direction about the rotational axis RA, and becomes possible in a state in which the container shutter 214 is in the closed position. In one position, as shown in part (a) of FIG. 13, the rotation-restricted portion 212*b* of the inserting portion 212 exposed from the container shutter opening 214*c* of the container shutter 214 and the rotation restricting portion 247*a* of the rotation restricting member 247 are aligned with each other. In the other position, as shown in part (b) of FIG. 13, the container shutter portion-to-be-engaged 214*b* and the lever engaging portion 201*d* are aligned with each other. When the alignment in the other position can be made, the alignment between the container shutter portion-to-be-engaged 214*b* and the main assembly shutter engaging portion 206*b* can also be made. This is because the lever engaging portion 201*d* and the main assembly shutter engaging portion 206*b* overlap with each other as viewed in the direction of the rotational axis RA.

In a state in which the mounting of the supply pack 210 on the supplying portion 200 is completed, the container shutter portion-to-be-engaged 214*b* not only engages with the lever engaging portion 201*d* but also engages with the main assembly shutter engaging portion 206*b* of the main assembly shutter 206. Further, the rotation-restricted portion 212*b* of the inserting portion 212 engages with the rotation restricting portion 247*a*. In this state, as shown in FIG. 10, the user grips the gripping portion 201*b* and rotates the lever 201 clockwise 90 degrees, so that the lever 201 is rotated from the operation position to the supplying position relative to the inserting portion 212.

At this time, the container shutter portion-to-be-engaged 214*b* is pressed by the lever engaging portion 201*d*, and the container shutter 214 is rotated together with the lever 201 from the closed position and the open position. The main assembly shutter engaging portion 206*b* is pressed by the container shutter portion-to-be-engaged 214*b*, and the main assembly shutter 206 is rotated together with the lever 201 and the container shutter 214 from the closed position to the open position. Thus, the main assembly shutter 206 is constituted so as to be rotated by the lever 201 through the container shutter 214, so that the lever 201 is not rotated even when the lever 201 is rotated from the operation position to the supplying operation in a state in which the supply pack 210 is not mounted on the supplying portion 200. Therefore, even when the lever 201 is operated by the user in the state in which the supply pack 210 is not mounted on the supplying portion 200, the main assembly shutter 206 does not open.

When the lever 201 is in the supplying position in the state in which the supply pack 210 is mounted on the supplying portion 200, both the container shutter 214 and the main assembly shutter 206 are in the open position, so that the container shutter opening 214*c* and the main assembly shutter opening 206*a* communicate with each other. In this state, as shown in FIG. 14, the user loosens (deforms) the pouch 211 with the user's hands, so that the toner in the pouch 211 is moved together with the air toward the inserting portion 212. Then, the toner moved into the inserting portion 212 passes through the inserting portion opening 212*a*, the container shutter opening 214*c*, and the main assembly shutter opening 206*a*, and is supplied to the accommodating portion 18 of the developing container 230.

In the case where the toner supply is completed and the supply pack 210 is dismounted from the supplying portion 200, as shown in FIG. 10, the user grips the gripping portion 201*b* and rotates the lever 201 counterclockwise 90 degrees. By this operation, the lever 201 is rotated relative to the inserting portion 212 from the supply position to the operation position. At this time, the container shutter portion-to-be-engaged 214*b* is pressed by the lever engaging portion 201*d*, so that the container shutter 214 is rotated together with the lever 201 from the open position to the closed position. The main assembly shutter engaging portion 206*b* is pressed by the container shutter portion-to-be-engaged 214*b*, so that the main assembly shutter 206 is rotated together with the lever 201 and the container shutter 214 from the open position to the closed position. The supply pack 210 is dismounted from the supplying portion 200 in a state in which the lever 201 is in the operation position. In a state in which the supply pack 210 is dismounted from the supplying portion 200, the container shutter 214 is in the closed position, and therefore, toner leakage from the inserting portion opening 212*a* of the supply pack 210 can be prevented.

[Controller]

Part (a) of FIG. 15 is a block diagram showing a hardware constitution of the controller 302 provided in the image forming apparatus 1. The controller 302 includes a CPU 302*a* as a calculating device, the ROM 302*b*, and a RAM 302*c*. The CPU 302*a* reads various programs stored in the ROM 302*b* and executes processing. The RAM 302*c* is used as an operation (working) area of the CPU 302*a*.

To an input side of the controller 302, the switch 208, a temperature sensor 9*d*, and the remaining amount detecting portion 312 as the remaining toner amount detecting portion are connected. The temperature sensor 9*d* detects a temperature of the fixing nip of the fixing portion 9. To an output side of the controller 302, the motor 311 as the actuator and a display portion 415 are connected. Further, to the controller 302, an I/O controller 313 as an input/output port connected to the external device is connected.

The motor 311 drives the stirring member 60 and various rollers (the photosensitive drum 11, the developing roller 12, and various conveying rollers) in the image forming apparatus 1. Incidentally, in this embodiment, all the rollers in the image forming apparatus 1 and the stirring member 60 are driven by the single motor 311, but the present invention is not limited thereto. For example, the stirring member 60 and a part of the rollers in the image forming apparatus 1 are driven by the motor 311, and other rollers may be driven by another motor. Further, a constitution in which the motor 311 is connected to all the rollers by drive transmission members such as gears and in which an electromagnetic clutch is provided between the motor 311 and the stirring member 60 may be employed. In this case, an actuator for turning on and off the drive of the stirring member 60 is the electromagnetic clutch.

Part (b) of FIG. 15 is a block diagram showing a functional constitution of the controller 302 provided in the image forming apparatus 1. The controller 302 includes a temperature detecting portion 303, a drive controller 304, a transmitting and receiving portion 305, a remaining amount calculating portion 306, and a storing portion 315. The temperature detecting portion 303 detects a current temperature of the fixing portion 9 on the basis of a temperature detecting signal 307 from a temperature sensor 9*d*. The drive controller 304 controls drive of the motor 311 as needed on the basis of a print operation, initial control, or the like of the image forming apparatus 1.

A drive enablement discriminating portion 314 discriminates whether or not the motor 311 may be driven, depending on a state of the image forming apparatus 1. For example, the drive enablement discriminating portion 314 does not permit the drive of the motor 311 in the case of a jam state in which the recording material P is stagnated in the image forming apparatus 1 or a state in failure of the image forming apparatus 1, or in the like case. The drive controller 304 drives the motor 311 on the basis of discrimination of the drive enablement discriminating portion 314.

The remaining amount calculating portion 306 calculates an amount of the toner accommodated in the accommodating portion, on the basis of a remaining amount detecting signal 309 outputted from the remaining amount detecting portion 312 disposed on the accommodating portion 18. The transmitting and receiving portion 305 makes transmission and reception of information between itself and the I/O controller 313 for receiving the image information from a host such as a PC (not shown), and in this embodiment, particularly transmits, as remaining amount information 308, a remaining amount of the toner accommodated in the accommodating portion 18 to the external PC or the like.

Here, the remaining toner amount is transmitted in "%" notation by taking, for example, an amount of the toner capable of being accommodated in the accommodating portion 18 as 100%. Further, although the remaining amount detecting signal 309 varies depending on a constitution of the remaining amount detecting portion 312, the remaining amount detecting signal 309 may be an analog signal such that a voltage changes depending on, for example, a remaining developer amount or may be a signal which is outputted in a certain period and which is a pulse signal changing in H/L pulse width depending on the remaining toner amount, for example. In this embodiment, the remaining amount detecting signal 309 outputted from the remaining amount detecting portion 312 is the above-described pulse signal. Further, a Low pulse is outputted when the optical path Q1 (see FIG. 4) of the remaining amount detecting portion 312 is blocked by the toner in the accommodating portion 18, and a High pulse is outputted when the optical path Q1 is not blocked by the toner in the accommodating portion 18. The controller 302 measures, as a pulse count, the High pulse outputted when the stirring member 60 rotates one turn. The pulse count as an output value becomes large with a longer time in which light passes through the optical path Q1, i.e., with a smaller amount of the toner in the accommodating portion 18. That is, the controller 302 predicts that the amount of the toner in the accommodating portion 18 is smaller with a larger pulse count and predicts that the amount of the toner in the accommodating portion 18 is larger with a smaller pulse count.

[Remaining Toner Amount Display]

Next, remaining toner amount display in this embodiment will be described. The display portion 415 is provided, as shown in FIG. 1, on a right side of a front surface of the casing 72 of the image forming apparatus 1 and displays information on the remaining toner amount of the toner in the accommodating portion 18 of the developing container 230.

Parts (a) to (d) of FIG. 16 are enlarged views of the display portion 415. As shown in parts (a) to (d) of FIG. 16, the display portion 415 is constituted so as to be capable of being lighted and extinguished, and is a panel member including a plurality (three in this embodiment) of scales arranged vertically. As shown in part (a) of FIG. 16, in the case where only a lower scale is blinking, the scale shows that a level of the remaining toner amount of the accommodating portion 18 is "NearOut" level. As shown in part (b) of FIG. 16, in the case where only the lower scale is continuously lighted, the scale shows that the level of the remaining toner amount of the accommodating portion 18 is "Low" level. As shown in part (c) of FIG. 16, in the case where the lower scale and a central scale are lighted and an upper scale is extinguished, these scales show that the level of the remaining toner amount of the accommodating portion 18 is "Mid" level. As shown in part (d) of FIG. 16, in the case where all the three scales are lighted, these scales show that the level of the remaining toner amount of the accommodating portion 18 is "Full" level.

Incidentally, the display portion 415 is not limited to a liquid crystal panel, but may be constituted by a light source such as an LED or an incandescent lamp or by a diffusion lens. Further, a constitution in which the display portion 415 is not separately provided and in which a display of the operating portion displays the remaining toner amount by the scales as described above in this embodiment may be employed. Further, although the display portion 415 in this embodiment has the three scales, the number of scales is not limited thereto, and may be appropriately set depending on a constitution or the like of the image forming apparatus used.

Next, using FIG. 17, switching of the display of the display portion 415 in this embodiment will be described. FIG. 17 is a schematic view for illustrating thresholds for switching display of the display portion 415 depending on a detection result of the remaining toner amount of the accommodating portion 18 of the developing container 230 and display patterns of the display portion 415.

As shown in FIG. 17, when the remaining toner amount of the toner in the accommodating portion 18 fluctuates depending on toner consumption or toner supply in an operation in an image forming mode, switching of the display of the display portion 415 is made on the basis of a detection result of the remaining amount detecting portion 312. That is, the display portion 415 displays the remaining toner amount on the basis of the remaining amount detection signal 309 outputted from the remaining amount detecting portion 312. Specifically, in the case where the detection result of the remaining toner amount of the accommodating portion 18 by the remaining amount detecting portion 312 is a threshold D or more, the controller 302 causes the display portion 415 to display the Full level at which all the three scales are lighted (first display). Further, in the case where the detection result of the remaining toner amount of the accommodating portion 18 by the remaining amount detecting portion 312 is less than the threshold D and a threshold C or more, the controller 302 causes the display portion 415 to display the Mid level at which the two scales are lighted (second display). In this embodiment, a value of the threshold D was set at 5.0 k. Various thresholds including the threshold D described in the following may appropriately be set depending on an amount (capacity) of the toner supplied or depending on various constitutions of the image forming apparatus used.

In the case where the detection result of the remaining toner amount of the accommodating portion 18 by the remaining amount detecting portion 312 is less than the threshold C (2.5 k in this embodiment) and is a threshold B or more, the controller 302 causes the display portion 415 to display the Low level at which the one scale is lighted (third display). Further, in the case where the detection result of the remaining toner amount of the accommodating portion 18 by the remaining amount detecting portion 312 is less than the threshold B (0.5 k in this embodiment) and is a threshold A or more, the controller 302 causes the display portion 415 to display the NearOut level at which the lower one scale is blinking (fourth display). Further, in the case where the detection result of the remaining toner amount of the accommodating portion 18 by the remaining amount detecting portion 312 is less than the threshold A (0 k in this embodiment), the controller 302 discriminates that the toner in the accommodating portion 18 has run out, and puts the three scales in a toner out state in which all the three scales are extinguished.

That is, in the case where the detection result of the remaining toner amount of the accommodating portion 18 by the remaining amount detecting portion 312 is 5.0 k or more, the controller 302 makes the display of the display portion 415 the first display. In the case where the detection result of the remaining toner amount of the accommodating portion 18 by the remaining amount detecting portion 312 is in a range from 2.5 k to 5.0 k, the controller 302 makes the display of the display portion 415 the second display. In the case where the detection result of the remaining toner amount of the accommodating portion 18 by the remaining amount detecting portion 312 is in a range from 0.5 k to 2.5 k, the controller 302 makes the display of the display portion the third display. Further, in the case where the detection result of the remaining toner amount of the accommodating portion 18 by the remaining amount detecting portion 312 is in a range from 0 k to 0.5 k, the controller 302 makes the display of the display portion 415 the fourth display. In the case where the controller 302 discriminated that there is no remaining amount, the controller 302 brings the display portion 415 into a state in which all the scales are extinguished.

An interval (difference) between a toner amount corresponding to the threshold D and a toner amount corresponding to the threshold C in this embodiment, i.e., an interval (difference) between toner amounts corresponding to thresholds relating to switching of display of the uppermost scale is set to a supply amount (2.5 k) corresponding to a single supply pack 210. Similarly, an interval (difference) between a toner amount corresponding to the threshold C and a toner amount corresponding to the threshold A, i.e., an interval between toner amounts corresponding to thresholds relating to switching of display of the mid scale is also set to the supply amount corresponding to the single supply pack 210. By thus setting the interval between toner amounts corresponding to thresholds relating to switching of display of an associated scale, the toner in the supply pack 210 which has never been used is normally supplied, and then the display of the display portion 415 is switched, so that the user can recognize that the toner supply is completed. Further, the user is capable of easily discriminating the number of supply packs 210 which can be supplied, and therefore, it is possible to improve viewability of a toner supply enablement or disablement status to the user.

Further, in this embodiment, the display portion 415 is capable of making a supply mode display shown in each of parts (a) and (b) of FIG. 18 separately from the toner supply display described with reference to FIG. 17. The supply mode display is a display for causing the user to recognize during execution of an operation in the supply mode. As the supply mode display, a pattern such that a state in which the three scales of the display portion 415 are lighted one by one is repeated as shown in part (a) of FIG. 18, a pattern such that a state in which all the three scales are extinguished and a state in which all the three scales are lighted are repeated as shown in part (b) of FIG. 18, and the like pattern would be considered. The supply mode display is not limited to these specific two patterns, but, for example, a pattern such that a state in which the three scales are extinguished one by one from a state in which all the three scales are lighted is repeated, a pattern such that the first display to the fourth display of the display portion 415 described above are randomly switched, and the like pattern would be considered. As the supply mode display, a constitution in which of five states consisting of the first display to the fourth display shown in parts (a) to (d) of FIG. 16, respectively, and an all extinguished state (toner out state) in which no scale is lighted, at least two states are repetitively displayed may only be required to be employed. By this, it is possible to display a state which is not any one of the above-described five states, so that it is possible to cause the user to visually recognize that the operation in the supply mode is under execution.

[Control of Display Portion in Supplying Operation]

Next, control of the display portion 415 when a supplying operation for supplying the toner from the supply pack 210 to the accommodating portion 18 is performed will be described using flowcharts of FIGS. 19 and 20.

As shown in FIG. 19, when the print(ing) of the image on the recording material P is completed (step S11), the controller 302 carries out remaining amount discrimination for discriminating remaining toner amount information on the toner in the accommodating portion 18. Then, the controller 302 causes a memory which is, for example, the RAM 302*c* or the ROM 302*b*, to store a result of the remaining amount discrimination as pre-supply remaining amount information (step S12). For example, as shown in FIG. 21, in the case where a pulse count before the toner supply is a pulse count PE1, the controller 302 causes the memory to store the pulse count PE1 as the pre-supply remaining amount information.

Then, returning to the description of FIG. 19, on the basis of a detection result of the switch 208, the controller 302 discriminates whether or not the lever 201 is in the supplying position (step S13). Incidentally, the controller 302 may discriminate that the lever 201 is in the supplying position on the basis of detection by the open/close detecting portion that the discharge tray 14 is moved from the closed position to the open position, instead of the detection result of the switch 208.

In this embodiment, the supply pack 210 is mounted on the supplying portion 200 and then the lever 201 is rotated from the operation position to the supplying position, so that the toner supply from the supply pack 210 to the accommodating portion 18 becomes possible as described above. In a state in which the lever 201 is in the open position, the user loosens the pouch 211 of the supply pack 210 and thus can supply the toner from the supply pack 210 to the accommodating portion 18. When rotation of the lever 201 from the operation position to the supplying position is detected by the switch 208, (step S13: Yes), the supply mode display is started in the display portion 415 (step S14).

When the supply mode display is started, the controller 302 determines a supply time threshold on the basis of the pre-supply remaining amount information as a first output value stored in the memory in the step S12 (step 15). A rectilinear line 11 of FIG. 21 shows a relationship between the toner amount of the toner in the accommodating portion 18 and a pulse count based on a detection result of the remaining amount detecting portion 312. A rectilinear line L2 is used for determining the supply time threshold based on the pre-supply remaining amount information and is schematically shown in a rectilinear line shape. As shown in FIG. 21, in the case where the pulse count PE1 is recorded as the pre-supply remaining amount information, the controller 302 determines a supply time threshold PET on the basis of the pulse count PE1 and the rectilinear lines L1 and L2. Incidentally, the ROM 302*b* or the RAM 302*c* may store a table showing a relationship between the pre-supply remaining amount information and the supply time threshold. On the basis of this table, the controller 302 may determine the supply time threshold from the pre-supply remaining amount information. The pre-supply remaining amount information and the supply time threshold do not need to have a certain correlation in all of toner amount regions, and may acquire an appropriate supply time threshold in advance by an experiment for each of pieces of the pre-supply remaining amount information.

Returning to the description of FIG. 19, then the controller 302 discriminates whether or not the lever 201 is in the operation position on the basis of the detection result of the switch 208 (step S16). That is, the controller 302 discriminates whether or not the lever 201 is moved from the supplying position to the operation position. In the case where discrimination that the lever 201 is in the operation position is made (step S16: Yes), the controller 302 discriminates whether or not the motor 311 is capable of being driven (step S17). Incidentally, the drive of the motor 311 is stopped between the step S13 to the step S16. For this reason, drive noise generating, during the supplying operation performed by the user, from the motor 311, gears for driving the stirring member 60, and the like does not generate, so that the user does not readily hesitate to perform the supplying operation.

In the case where a state in which the print operation can be performed without delay even when the motor 311 is driven is formed, the motor 311 is discriminated as being drivable, and in the case where a state in which a jam becomes serious when the motor 311 is driven is formed, or in the like case, the motor 311 is discriminated as being undrivable. Further, also in the case where inconveniences occur in the image forming apparatus 1, the motor 311 is discriminated as being in an undrivable state. Incidentally, as in this embodiment, in the case where all the rollers in the image forming apparatus 1 and the stirring member 60 are driven by the single motor 311, the step S17 is needed, but the present invention is not limited thereto. For example, in the case where rollers relating to conveyance of the recording material are not driven, the step S17 is not needed.

In the case where the motor 311 is discriminated as being drivable (step S17: Yes), the controller 302 starts the drive of the motor 311 (step S18). By this, the stirring member 60 provided in the accommodating portion 18 is driven. Then, the controller 302 discriminates whether or not a predetermined time has elapsed from the start of the drive of the motor 311 (step S19). In this embodiment, the predetermined time is set to 3 sec. The stirring member 60 smooths the toner in the accommodating portion 18 in 3 sec. This smoothing of the toner in the accommodating portion 18 by the stirring member 60 is executed for preparing for remaining toner amount detection executed in a subsequent step, but may also be omitted.

In the case where discrimination that the predetermined time has elapsed is made (step S19: Yes), the controller 302 causes the remaining amount detecting portion 312 to start the remaining toner amount detection of the toner in the accommodating portion 18 and acquire a pulse count which is remaining toner amount information after the toner supply (step S20). At this time, the controller 302 acquires, for example, a pulse count PE2 as post-supply remaining amount information in FIG. 21. Incidentally, the controller 302 stops the drive of the motor 311 when the remaining toner amount detection is ended.

Next, the controller 302 discriminates a post-supply remaining amount zone from the post-supply remaining amount information PE2 as an acquired second output value and the supply time threshold (PET) (step S21). That is, as shown in FIG. 20, the controller 302 discriminates whether or not the pulse count PE2 is larger than the supply time threshold PET (step S31).

As described above, the supply amount (2.5 k) corresponding to the single supply pack 210 in this embodiment and the scale switching interval of the display portion 415 are set at the same amount. That is, when the toner in the supply pack 210 that has never been used is supplied in a whole amount, the number of lighted scales of the display portion 415 is increased by 1, so that the user can recognize that the toner in an amount corresponding to a full amount of the toner in the single supply pack 210 is normally supplied. Here, for example, as shown in FIG. 17, it is assumed that the pulse count PE1 which is a pulse count before the (toner) supply is a value in a remaining amount zone of the Low level, and the pulse count PE2 which is a pulse count after the supply is a value in a remaining amount zone of the Mid level. Further, the supply time threshold (PET) is obtained by subtracting a predetermined value from the pulse count (PE1) which is the pre-supply remaining amount information. The predetermined value may preferably be a value which is less than the amount of the toner in the supply pack 210 that has never been used and which corresponds to not less than ½ of the amount of the toner in the supply pack 210 that has never been used. More preferably, the predetermined value is a value which is less than the amount of the toner in the supply pack 210 that has never been used and which corresponds to not less than ⅔ of the amount of the toner in the supply pack 210 that has never been used. That is, the supply time threshold (PET) is used for discriminating whether or not the toner in the amount in the supply pack 210 is normally supplied, and the predetermined value may preferably be a value close to the amount of the toner in the supply pack 210 that has never been used.

Further, the supply time threshold (PET) is a value between the pulse count (PE2) and the pulse count (PE1) which is the pre-supply remaining amount information. The pulse count (PE2) which is a third output value is a value outputted by the remaining amount detecting portion 312 when the toner in a full amount accommodated in the supply pack 210 that has never been used is normally supplied to the accommodating portion 18 before the toner supply. Further, the supply time threshold (PET) is a value closer to the pulse count (PE2) when the toner is normally supplied than to the pulse count (PE1) which is the pre-supply remaining amount information. In other words, the supply time threshold (PET) is set on the basis of the pulse count (PE1) which is the pre-supply remaining amount information and the whole amount of the toner accommodated in the supply pack 210 that has never been used.

In the step S31, in the case where the pulse count (PE2) is the supply time threshold (PET) or less (step S31: No), the controller 302 discriminates that the post-supply remaining amount information is a remaining amount zone subsequent to a post-supply remaining amount zone (step S32). That is, when the pulse count (PE2) is the supply time threshold (PET) or less, the controller 302 regards the state as that the toner in the supply pack 210 is normally supplied to the accommodating portion 18, and discriminates that the display of the display portion 415 should be changed to the subsequent remaining amount zone.

For example, the controller 302 discriminates that the state of the display portion 415 should be changed from a state in which only one scale is lighted as the Low level (see part (b) of FIG. 16) to a state in which two scales are lighted as at the Mid level (see part (c) of FIG. 16). Incidentally, steps S14 to S22 of FIG. 19 relate to the supply mode display, so that the discrimination of the post-supply remaining amount in the step S21 is reflected in the display portion 415 after the supply mode display is switched to the remaining toner amount display in a step S23.

On the other hand, in the case where in the step S31, the pulse count (PE2) is larger than the supply time threshold (PET) (step S31: Yes), the controller 302 discriminates that the remaining amount zone is unchanged (step S33). That is, in the case where the pulse count (PE2) is larger than the supply time threshold (PET), the controller 302 regards the state as that the supplying operation is irregularly performed, and discriminates that the display of the display portion 415 should not be changed to the subsequent remaining amount zone.

For example, in the case where the supplying operation by an empty or a substantially empty supply pack 210 is performed, the toner in the accommodating portion 18 does not increase in amount, so that the display of the display portion 415 may preferably be unchanged. Further, depending on the toner amount of the toner in the accommodating portion 18 before the toner supply, although the toner is supplied to the accommodating portion 18 only in a small amount, a pulse count after the toner supply falls within the subsequent remaining amount zone in some cases. However, in such case, when the display of the display portion 415 is changed to display of the subsequent remaining amount zone (for example, the level is changed from the Low level to the Mid level), although the toner is little supplied to the accommodating portion 18, the user erroneously recognizes that the toner is sufficiently supplied in some instances. In order to suppress such an erroneous recognition, in this embodiment, in the case where the pulse count after the toner supply is larger than the supply time threshold, i.e., unless a toner in a certain amount is supplied to the accommodating portion 18, the display of the display portion 415 is not changed. Such a constitution is employed.

Returning to the description of FIG. 19, when the discrimination of the post-supply remaining amount zone is ended, the controller 302 causes the memory to store the discrimination of the post-supply remaining amount zone made in the step S21 (step S22). Next, the controller 302 switches the display from the supply mode display to the remaining toner amount display, and reflects, in the display portion 415, the post-supply remaining amount zone stored in the memory in the step S22 (step S23). By the above, control of the display portion 415 in the supplying operation is ended.

Further, using FIG. 21, the case where the sequence goes from the step S31 to the step S33 of FIG. 20 will be described again specifically. As shown in FIG. 21, in the case where the pulse count before the toner supply is a pulse count PF1, the controller 302 causes the memory to store the pulse count PF1 as the pre-supply remaining amount information. Then, on the basis of the pulse count PF1 which is the pre-supply remaining amount, the controller 302 determines a supply time threshold PFT by making reference to the rectilinear line L2. Incidentally, the supply time threshold PFT is used for discriminating that the toner supply in the certain amount or more was made, and as described above, is obtained by subtracting the predetermined value from the pulse count (PF1) which is the pre-supply remaining amount information.

Further, it is assumed that the controller 302 acquires a pulse count PF2 as post-supply remaining amount information in the step S20. Here, for example, it is assumed that the pulse count PF1 which is a pulse count before the (toner) supply is a value in a remaining amount zone of the Mid level, and the pulse count PF2 which is a pulse count after the supply is a value in a remaining amount zone of the High level.

In the case of this embodiment, the pulse count (PF2) after the toner supply is larger than the supply time threshold (PFT) (step S31: Yes), so that the controller 302 discriminates that the remaining amount zone is unchanged (step S33). That is, the controller 302 regards the state as that the supplying operation is irregularly performed, and discriminates that the display of the display portion 415 should not be changed to the subsequent remaining amount zone. Therefore, when the display is switched to the remaining toner amount display (step S23), the display of the display portion 415 is kept at the Mid level.

The pulse count PF2 which is the pulse count after the toner supply is a value of a remaining amount zone at the High level, so that in the case where control for keeping the display of the display portion 415 at the Mid level as in this embodiment is not carried out, the display of the display portion 415 becomes the High level. Thus, when the display of the display portion 415 is changed to display (High level) of a subsequent remaining amount zone although an irregular supplying operation in which supply of the toner in the certain amount or more is not made, there is a liability that deviation occurs between an actual remaining toner amount and a remaining toner amount recognized by the user. By the control in this embodiment in which the supply time threshold is set on the basis of the pre-supply remaining amount information, it is possible to discriminate whether or not the toner in the certain amount or more was supplied, so that usability relating to the toner supply can be improved.

As described above, in this embodiment, the supply time threshold is changed on the basis of the pre-supply remaining amount information outputted from the remaining amount detecting portion 312 before the lever 201 is moved from the closed position to the open position. For example, in the case where the pulse count of the remaining amount detecting portion 312 becomes smaller with a larger toner amount of the toner accommodated in the accommodating portion 18, the supply time threshold becomes lower with a smaller pre-supply remaining amount information (pulse count). Then, by comparing the post-supply remaining amount information (pulse count) with the supply time threshold, it is possible to discriminate whether or not the toner in the certain amount or more is supplied. In this embodiment, in the case where the post-supply remaining amount information is the supply time threshold or less, the state of the display portion 415 is changed from a first state (for example, Low level) to a second state (for example, Mid level). Further, in the case where the post-supply remaining amount information is larger than the supply time threshold, the display portion 415 is kept in the first state irrespective of the post-supply remaining amount information.

Incidentally, the first state is a state in which a scale or scales, in a first number of the display portion 415 are lighted, and the second state is a state in which a scale or scales, in a second number larger than the first number, of the display portion 415 are lighted. These first and second numbers are not particularly limited, but in this embodiment, the first number is 0 to 2, and the second number is 1 to 3.

By this, it is possible to discriminate the irregular supplying operation by the user, so that the usability relating to the toner supply can be improved.

Further, as in the case of the supply pack 210 in this embodiment, in order to supply the toner from the supply pack 210 to the accommodating portion 18 of the developing container 230, in some cases, there is a need that the user performs the supplying operation such as loosening (deformation) of the pouch 211 by the user. The operation in the supplying mode in this embodiment has an effect such that the user does not readily hesitate the supplying operation because drive noise generating from the motor 311 and the gears or the like for driving the stirring member 60 during the supplying operation performed by the user does not generate.

Other Embodiments

Incidentally, in this embodiment, although the supply pack 210 including the pouch 211 is used, the present invention is not limited thereto. For example, even when the supply pack 210 is a resin container such that the user pushes out the toner by pressing a plunger or a resin container such that the user discharges the toner to the outside by tapping (hitting) or deforming the resin container, the effect of this embodiment is obtained.

Further, the display portion 415 is not limited to a liquid crystal panel, but may be constituted by a light source such as an LED or an incandescent lamp, and by a diffusion lens. Further, a constitution in which display of the remaining toner amount by the scales as described in this embodiment is made on an operating display where the user makes various settings without separately providing the display portion 415 may be employed. Further, in the supplying operation, in the case where discrimination that the remaining amount zone is unchanged as described in the step S33 of FIG. 20, the user may be notified of execution of the irregular supplying operation by the display on the operating display, voice, or the like.

Further, in this embodiment, although the lever 201 is operated in a state in which the supply pack 210 is mounted on the supplying portion 200 and thus the supply pack 210 is capable of being changed in state between a supply enable state and a supply disable state, the present invention is not limited thereto. For example, a constitution in which the supply pack 210 is changed in state between the supply enable state and the supply disable state by rotating the supply pack 210 itself instead of the operation of the lever 201 may also be employed. That is, a constitution in which in interrelation with the rotation operation of the supply pack 210, the container shutter 214 and the main assembly shutter 206 are rotated may also be employed.

Further, the image forming apparatus of this embodiment has the constitution including the main assembly shutter, but may also use a removable cap instead of the main assembly shutter. A constitution in which the user dismounts (removes) or moves the cap and then mounts the supply pack 210 onto the supplying portion 200 may be employed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-178498 filed on Nov. 7, 2022, which is hereby incorporated by reference herein in its entirety.

What is claimed is:

1. An image forming apparatus to which a toner container for accommodating toner is mountable, comprising:

a mounting portion to which the toner container is to be mounted;

an accommodating portion configured to accommodate the toner supplied from the toner container mounted on the mounting portion;

a remaining toner amount detecting portion configured to output an output value on the basis of a toner amount of the toner accommodated in the accommodating portion;

a display portion configured to display a remaining toner amount on the basis of the output value outputted from the remaining toner amount detecting portion, wherein a state of the display portion changes from a first state to a second state different from the first state by the toner being supplied in a predetermined amount or more from the toner container to the accommodating portion; and a controller configured to control the display portion, wherein (i) when a supplying operation for supplying the toner from the toner container to the accommodating portion is performed, the controller sets a threshold on the basis of a first output value outputted from the remaining toner amount detecting portion before the toner is supplied from the toner container to the accommodating portion, and (ii) the controller discriminates whether or not the toner in the predetermined amount or more is supplied to the accommodating portion by comparing the threshold with a second output value outputted from the remaining toner amount detecting portion after the toner is supplied from the toner container to the accommodating portion, wherein the threshold is a value between the first output value and a third output value outputted from the remaining toner amount detecting portion in a case in which the toner in a total amount accommodated in the toner container that has never been used is supplied to the accommodating portion before supply of the toner, and is closer to the third output value than to the first output value.

2. The image forming apparatus according to claim 1, wherein the output value outputted from the remaining toner amount detecting portion is lower with a larger toner amount of the toner accommodated in the accommodating portion, and the threshold is lower with a lower first output value, and wherein when the supplying operation is performed, the controller changes the state of the display portion from the first state to the second state in a case in which the second output value is the threshold or less, and maintains the state of the display portion in the first state in a case that the second output value is higher than the threshold.

3. The image forming apparatus according to claim 1, wherein the predetermined amount is less than the total amount of the toner accommodated in the toner container which has never been used and is not less than ⅔ of the total amount of the toner accommodated in the toner container which has never been used.

4. The image forming apparatus according to claim 1, further comprising:

a stirring member configured to stir the toner in the accommodating portion; and an actuator configured to drive the stirring member, wherein the remaining toner amount detecting portion includes a light emitting portion for emitting light and a light receiving portion for receiving the light which is emitted from the light emitting portion and which passes through an inside of the accommodating portion, and wherein the output value is a value corresponding to a time in which the light receiving portion receives the light emitted from the light emitting portion during one rotation of the stirring member.

5. The image forming apparatus according to claim 1, wherein the display portion includes a plurality of scales capable of being lighted and extinguished, and wherein of the plurality of scales, a first number of at least one scale is lighted in the first state, and a second number, greater than the first number, of at least two scales are lighted in the second state.

6. An image forming system comprising:

a toner container configured to accommodate toner; and an image forming apparatus to which the toner container is mountable, the image forming apparatus including:

a mounting portion to which the toner container is to be capable of being mounted;

an accommodating portion configured to accommodate the toner supplied from the toner container mounted on the mounting portion;

a remaining toner amount detecting portion configured to output an output value on the basis of a toner amount of the toner accommodated in the accommodating portion;

a display portion configured to perform a remaining toner amount display on the basis of the output value outputted from the remaining toner amount detecting portion, wherein a state of the display portion changes from a first state to a second state different from the first state by the toner being supplied in a predetermined amount or more from the toner container to the accommodating portion; and a controller configured to control the display portion, wherein (i) when a supplying operation for supplying the toner from the toner container to the accommodating portion is performed, the controller sets a threshold on the basis of a first output value outputted from the remaining toner amount detecting portion before the toner is supplied from the toner container to the accommodating portion, and (ii) the controller discriminates whether or not the toner in the predetermined amount or more is supplied to the accommodating portion by comparing the threshold with a second output value outputted from the remaining toner amount detecting portion after the toner is supplied from the toner container to the accommodating portion, wherein the threshold is a value between the first output value and a third output value outputted from the remaining toner amount detecting portion in a case in which the toner accommodated in the toner container that has never been used is supplied to the accommodating portion before supply of the toner, and is closer to the third output value than to the first output value.

7. The image forming system according to claim 6, wherein the toner container includes:

a pouch configured to accommodate the toner;

an end portion member provided with an opening for permitting discharge of the toner in the pouch to an outside of the toner container and provided at an end portion of the pouch; and a shutter movable relative to the end portion member between a closed position where the shutter closes the opening and an open position where the shutter opens the opening, wherein the mounting portion includes:

an operating portion including an engaging portion for engaging with the shutter in a state in which the toner container is mounted to the mounting portion, and configured to move together with the shutter by engagement of the engaging portion with the shutter, the operating portion being movable between a first position where the shutter is positioned in the closed position and a second position where the shutter is positioned in the open position; and a movement detecting portion configured to detect movement of the operating portion, and wherein the remaining toner amount detecting portion outputs the first output value before movement of the operating portion from the first position to the second position is detected by the movement detecting portion and outputs the second output value after movement of the operating portion from the second position to the first position is detected by the movement detecting portion.

8. The image forming system according to claim 7, wherein the pouch is formed of a polypropylene sheet.

9. The image forming system according to claim 7, wherein the pouch is configured so as not to rotate when the shutter is rotated by the operating portion.

10. The image forming apparatus according to claim 7, further comprising:

a stirring member configured to stir the toner in the accommodating portion; and an actuator configured to drive the stirring member, wherein the remaining toner amount detecting portion includes a light emitting portion for emitting light and a light receiving portion for receiving the light which is emitted from the light emitting portion and which passes through an inside of the accommodating portion, and wherein the output value is a value corresponding to a time in which the light receiving portion receives the light emitted from the light emitting portion during one rotation of the stirring member.

11. The image forming system according to claim 10, wherein the remaining toner amount detecting portion outputs the second output value after drive of the stirring member is started on the basis of detection of the movement of the operating portion from the second position to the first position by the movement detecting portion.

12. The image forming system according to claim 10, wherein drive of the stirring member is stopped in a period from detection of the movement of the operating portion from the first position to the second position by the movement detecting portion until detection of movement of the operating portion from the second position to the first position by the movement detecting portion.

13. The image forming system according to claim 7, wherein the controller executes control so that a supply mode display different from the remaining toner amount display is started in the display portion on the basis of detection of the movement of the operating portion from the first position to the second position by the movement detecting portion, and switches the supply mode display to the remaining toner amount display after detection of the toner amount detected by the remaining toner amount detecting portion is ended.

* * * * *